US010089168B2

(12) United States Patent
Herb et al.

(10) Patent No.: US 10,089,168 B2
(45) Date of Patent: Oct. 2, 2018

(54) SELF-HEALING CHARGING DEVICE

(71) Applicant: T-Mobile USA, Inc., Bellevue, WA (US)

(72) Inventors: Daniel E. Herb, Seattle, WA (US); Ahmad Arash Obaidi, Bellevue, WA (US); Jonathan Soini, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 293 days.

(21) Appl. No.: 14/976,068

(22) Filed: Dec. 21, 2015

(65) Prior Publication Data

US 2016/0139974 A1 May 19, 2016

Related U.S. Application Data

(63) Continuation-in-part of application No. 14/542,330, filed on Nov. 14, 2014, now Pat. No. 10,031,826.

(51) Int. Cl.
*G06F 11/07* (2006.01)
*G06F 11/32* (2006.01)
(Continued)

(52) U.S. Cl.
CPC ........ *G06F 11/079* (2013.01); *G06F 11/0742* (2013.01); *G06F 11/0793* (2013.01);
(Continued)

(58) Field of Classification Search
CPC ............................ G01R 31/36; G01R 31/3606; G01R 31/3624; G01R 31/3627; G01R 31/3634;
(Continued)

(56) References Cited

U.S. PATENT DOCUMENTS 6,792,393 B1 9/2004 Farel et al.
8,560,865 B2 10/2013 Goel
(Continued)

FOREIGN PATENT DOCUMENTS

JP 2010081683 A 4/2010
WO WO2012098554 7/2012
WO WO2013152190 10/2013

OTHER PUBLICATIONS

PCT Seach Report and Written Opinion dated Mar. 8, 2016 for PCT application No. PCT/US2015/058561, 9 pages.
(Continued)

*Primary Examiner* — Van Trieu
(74) *Attorney, Agent, or Firm* — Lee & Hayes, PLLC

(57) ABSTRACT

Self-healing charging devices and techniques for identifying and/or troubleshooting causes of performance degradation in user devices are described. A charging device described herein can receive first data from a user device connected to the charging device and analyze the first data to determine diagnostic data associated with the user device. Based at least in part determining the diagnostic data, the charging device described herein can provide an indication via at least one of the charging device or the user device, the indication signifying available actions that can be taken to improve performance of the user device. The charging devices described herein can enable users to easily identify issues causing and/or leading to performance degradation on their user devices and remedy and/or prevent problems that cause the performance degradation while corresponding user devices are charging via the charging devices.

20 Claims, 9 Drawing Sheets

(51) Int. Cl.
*G06F 11/34* (2006.01)
*H04W 24/00* (2009.01)
*G08B 5/36* (2006.01)

(52) U.S. Cl.
CPC .............. *G06F 11/32* (2013.01); *G06F 11/34* (2013.01); *H04W 24/00* (2013.01); *G08B 5/36* (2013.01)

(58) Field of Classification Search
CPC ............ G01R 31/3637; G01R 31/3644; G01R 31/3648; G06F 11/07; G06F 11/0736; G06F 11/0751; G06F 11/0772; G06F 11/079; G06F 11/0793; G08B 5/36
See application file for complete search history.

(56) References Cited

U.S. PATENT DOCUMENTS

| | | | |
|---|---|---|---|
| 9,048,570 | B2 | 6/2015 | Goel |
| 9,646,480 | B2* | 5/2017 | Fadell .................... G01N 27/02 |
| 9,685,052 | B2* | 6/2017 | Kashar .................... G08B 7/06 |
| 2002/0094849 | A1* | 7/2002 | Cannon .................... H02J 7/00 455/573 |
| 2002/0198627 | A1 | 12/2002 | Nasman et al. |
| 2003/0197512 | A1* | 10/2003 | Miller ................ G01R 31/3648 324/426 |
| 2006/0089733 | A1 | 4/2006 | Dickinson et al. |
| 2007/0255460 | A1 | 11/2007 | Lopata |
| 2009/0040029 | A1 | 2/2009 | Bridges et al. |
| 2010/0222847 | A1 | 9/2010 | Goetz |
| 2013/0069598 | A1 | 3/2013 | Tanaka et al. |
| 2014/0327393 | A1 | 11/2014 | Lee et al. |

OTHER PUBLICATIONS

Office Action for U.S. Patent Application, dated Aug. 22, 2017, Herb, "Self-Healing Charging Device", 10 pages.

Sumner, Kelly, "MEEM—World's First Charger Cable with Automatice Back Up," available as early as Feb. 16, 2016 at <<https://www.kickstarter.com/projects/868671768/meem-memory-cable>>, Kickstarter, 22 pages.

Office action for U.S. Appl. No. 14/542,330, dated Apr. 11, 2017, Herb, "Self-Healing Charging Device", 9 pages.

Extended European Search Report dated May 15, 2018, for European Application No. 15859665.0, 8 pages.

* cited by examiner

SELF-HEALING CHARGING DEVICE

RELATED APPLICATIONS

This application claims priority to and is a continuation-in-part of U.S. patent application Ser. No. 14/542,330, filed on Nov. 14, 2014, entitled "Self-Healing Charging Device," the entire contents of which are incorporated herein in their entirety.

BACKGROUND

Performance of user devices such as smartphones or tablets can degrade with usage over time. Poor and/or inefficient performance can result in reduced battery life, application failures, dropped calls, user interface glitches, etc. Users rarely can identify what is causing the performance of a user device to degrade over time without inconvenience. Current techniques for identifying what is causing the performance of a user device to degrade overtime are intrusive in addition to being inconvenient. Generally, users are required to forgo access to their user devices and/or are generally required to travel to specific destination(s) (e.g., retail stores, etc.) in order to identify causes of the performance degradation. Similarly, service providers offering services (e.g., telecommunication services, connectivity services, etc.) via the user devices cannot identify causes of performance degradation utilizing current technologies.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
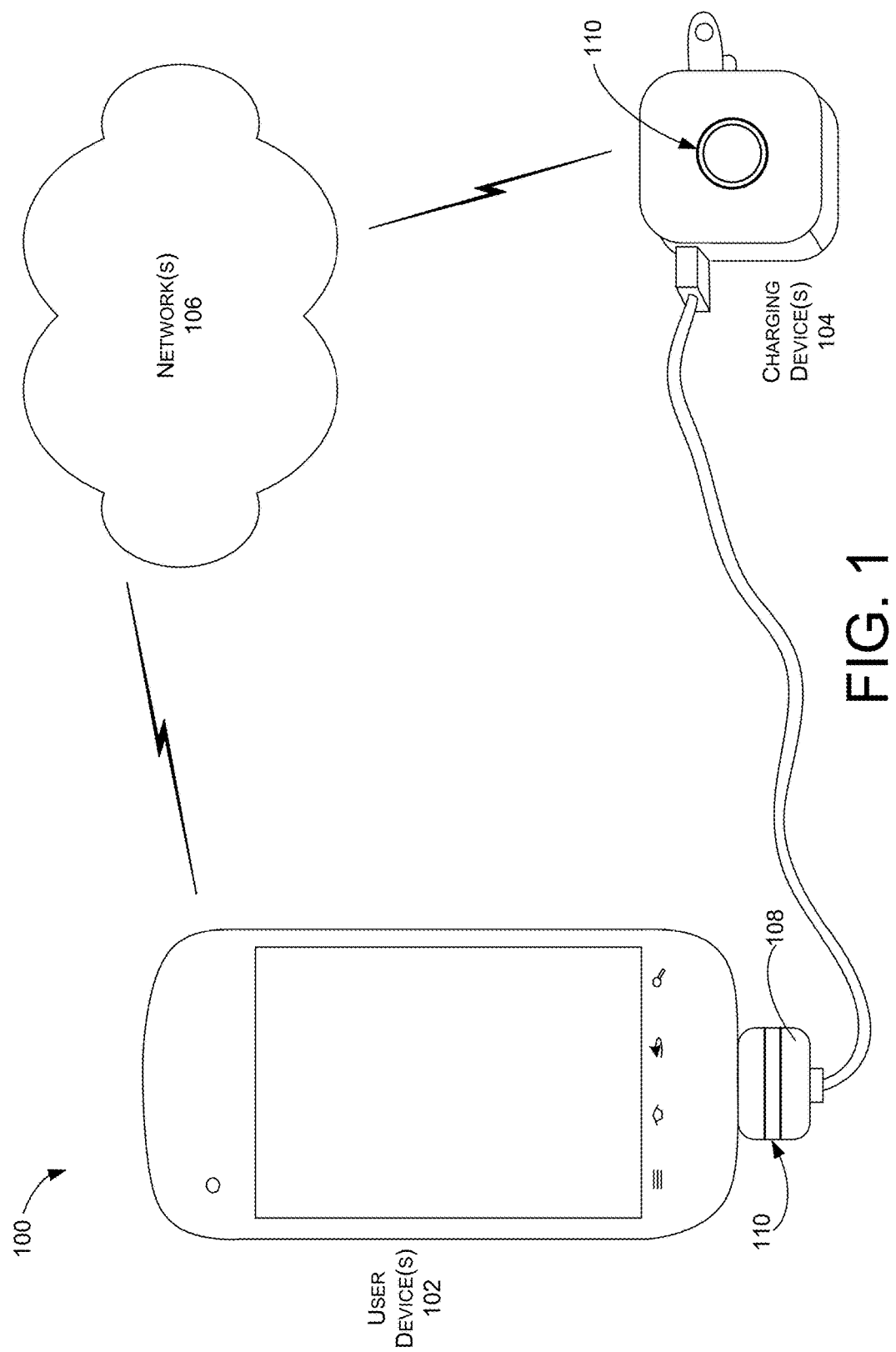
FIG. 1 is a schematic diagram illustrating an example environment for diagnosing and remedying problems on user devices via self-healing charging devices.

This disclosure describes, in part, techniques for diagnosing and remedying problems on user devices via self-healing charging devices. Additionally, this disclosure describes, in part, techniques for providing indications to users of user devices via the self-healing charging devices and/or input/output devices (e.g., Universal Serial Bus (USB), etc.) associated with the self-healing charging devices. Performance of user devices such as smartphones, tablets, etc., can degrade with usage over time. Poor and/or inefficient performance can result in reduced battery life, application failures, dropped calls, user interface glitches, etc. Poor and/or inefficient performance can result from various causes. In some examples, users neglect to update the operating system (OS) and/or software associated with applications running on user devices causing the user devices to operate less efficiently. In additional or alternative examples, usage patterns can affect the speed and/or efficiency of user devices. For instance, a user can operate his or her device with numerous applications running in the background. The numerous applications can consume resources causing a corresponding user device to operate less efficiently. In other instances, a user can write numerous files to a filing system associated with a user device causing the user device to operate less efficiently.

A user rarely can identify what is causing the performance of a user device to degrade over time without inconvenience and/or intrusion. Current techniques for identifying and/or predicting causes of performance degradation include performing a factory reset of a user device, installing and decoding bug logs, and/or using purpose-built diagnostic tools. For robust diagnostic and resolution, users typically are required to forgo access to their user devices during the performance(s) of a factory reset of user devices, installation and analysis of bug logs, and/or use of purpose-built diagnostic tools. Additionally, users are generally required to travel to specific destination(s) (e.g., retail stores, etc.) in order to identify causes of the performance degradation.

Self-healing charging devices and techniques for identifying and/or troubleshooting causes of performance degradation are described herein. The self-healing charging devices described herein can leverage performance logs associated with user devices to identify problems on the user devices while the user devices are charging. Additionally or alternatively, the self-healing charging devices can leverage a collection of data derived from a plurality of users and information sets associated with a network and consumer behavior to identify usage and/or performance patterns for predicting issues that can arise based on usage patterns of a particular user of a corresponding user device. The self-healing charging devices can enable users to easily identify issues causing and/or leading to performance degradation on user devices and to take action to remedy and/or prevent problems that cause the performance degradation.

In some examples, the self-healing charging devices can provide indications signaling to the users that there are one or more actions that can be taken to improve the performance of his or her user device, as described herein. In at least one example, the self-healing charging devices and corresponding input/output devices (e.g., USB, etc.) can include mechanisms for providing visual indicators to users of user devices via the self-healing charging devices and/or input/output devices associated with the self-healing charging devices. For instance, in some examples, the self-healing charging devices and/or corresponding input/output devices can include one or more light-emitting devices (e.g., light-emitting diodes (LED), fiber optic lighting devices, etc.), for providing visual indications to users. The one or more light-emitting devices can be configured to emit light in one or more colors. In some examples, each color of the plurality of colors can correspond to a type of a visual indication.

Example Environments

FIG. 1 is a schematic diagram illustrating an example environment 100 for diagnosing and remedying problems on user devices via self-healing charging devices. FIG. 1 includes user device(s) 102 that can be connected to charging device(s) 104. User device(s) 102 can represent a diverse variety of device types and are not limited to any particular type of user device. Examples of user device(s) 102 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, personal data assistants (PDAs), portable gaming devices, media players, cameras, or the like. Example embedded computers can include network enabled televisions, integrated components for inclusion in a computing device, appliances, microcontrollers, digital signal processors, or any other sort of processing device, or the like.

User device(s) 102 can communicatively couple to charging device(s) 104 via wired or wireless connections. Charging device(s) 104 can represent a diverse variety of device types and are not limited to any particular type of charging device. Examples of charging device(s) 104 can include but are not limited to wired charging devices, wireless charging devices, etc. Wired charging devices include standard outlet charging devices, USB charging devices, fuel-cell charging devices, kinetic-energy charging devices, 12 volt car port chargers (or other car chargers), etc. For instance, in some examples, the charging device(s) 104 can include one or more input/output devices 108 for facilitating wired charging and/or data transmission, as described herein. Wireless charging devices include wireless charging devices that use inductive coupling, conductive recharging mats, radio transmission, WiFi, Baseband, Bluetooth®, etc. In at least one example, charging device(s) 104 can include both wired and wireless technology.

The user device(s) 102 and/or the charging device(s) 104 can communicate with network(s) 106. In some examples, the network(s) 106 can be any type of network known in the art, such as the Internet. In other examples, the network(s) 106 may be, or may include, network(s) of telecommunication service provider(s), connectivity service provider(s), etc. Moreover, the user device(s) 102 and/or the charging device(s) 104 can communicatively couple to the network(s) 106 in any manner, such as by a global or local wired or wireless connection (e.g., local area network (LAN), intranet, etc.).

The network(s) 106 can facilitate communication between the user device(s) 102 and the charging device(s) 104 and/or service providers, described below. The network(s) 106 can also provide updates to the charging device(s) 104 and/or important information to users of the user device(s) 102 and/or charging device(s) 104. For instance, the network(s) 106 can provide OS and/or software updates and fixes that may be provided by manufacturers of the user device(s) 102 and/or service providers. Additionally, the network(s) 106 can observe the performance of the charging device(s) 104 for learning about the performance of the charging device(s) 104 and making improvements over time. Moreover, the network(s) 106 can collect usage and/or performance data from a plurality of users associated with the network(s) 106 for gaining intelligence and generating predictive models for predicting possible issues based on usage and/or performance of the user device(s) 102.

The user device(s) 102, the charging device(s) 104, and the network(s) 106 can communicate such to diagnose and remedy problems on the user device(s) 102 while the charging device(s) 104 charge the user device(s) 102. Based at least in part on determining that a user device 102 communicatively couples to a charging device 104, the charging device 104 can begin to receive and/or access performance logs, parameters, and/or data from the user device 102. The charging device 104 can continue to access logs, parameters, and/or data from the user device 102 until the user device 102 uncouples from the charging device 104. The charging device(s) 104 can leverage performance logs, parameters, and/or data received from user device(s) 102 to identify problems on the user device(s) 102 while the user device(s) 102 are charging.

Additionally or alternatively, the charging device(s) 104 can leverage a collection of data received from the network(s) 106 to identify and/or predict problems on the user device(s) 102 while the user device(s) 102 are charging. The collection of data can reflect the behavior of a plurality of users associated with a plurality of user device(s) 102 that are communicatively coupled to the network(s) 106 and can be used to identify usage and/or performance patterns. The usage and/or performance patterns can be leveraged for predicting issues that can arise based on usage patterns of users of user device(s) 102. The charging device(s) 104 can enable users to easily identify issues that are causing or have the potential to cause performance degradation while the user device(s) 102 are charging and can enable the users to take action to remedy and/or prevent problems that cause the performance degradation. Similarly, service providers offering services (e.g., telecommunication services, connectivity services, etc.) via the user devices 102 can leverage the performance logs, parameters, and/or data received from user device(s) 102 to identify causes of performance degradation on user device(s) 102 and/or their own networks 106.

In at least one example, the charging device(s) 104 and corresponding input/output devices 108 can include mechanisms for communicating information to users of user device(s) 102 via the self-healing charging devices and/or the input/output devices 108. For instance, in some examples, the charging device(s) 104 and/or corresponding input/output devices 108 can include one or more light-emitting devices 110 for providing visual indications to users. The one or more light-emitting devices 110 can be configured to emit a light in one or more colors. In some examples, each color of the plurality of colors can correspond to data associated with a different source and/or content.

Figure 2:
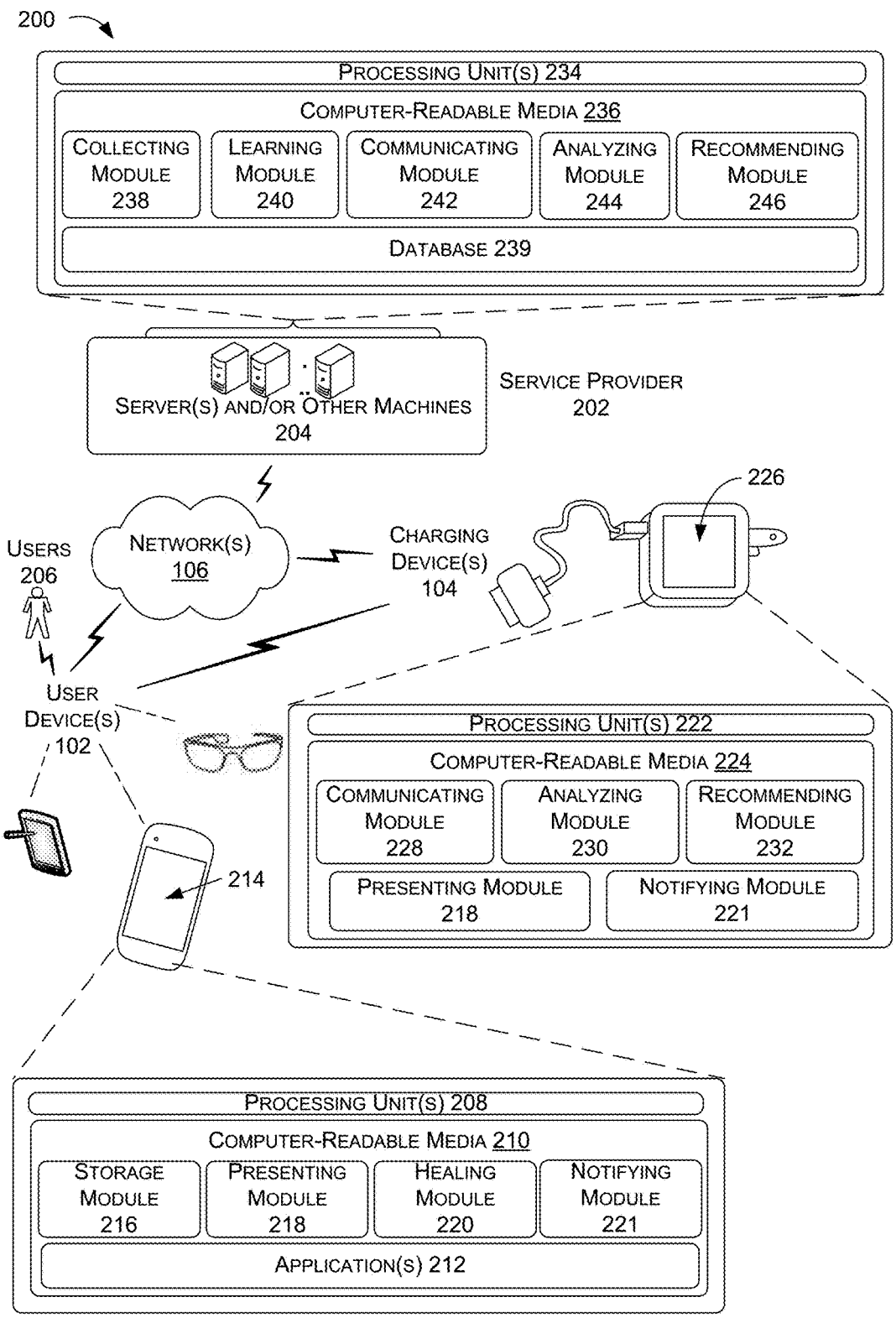
FIG. 2 is a schematic diagram illustrating an example environment for diagnosing and remedying problems on user devices via self-healing charging devices.

FIG. 2 is a schematic diagram illustrating an example environment 200 for diagnosing and remedying problems on user device(s) 102 via self-healing charging device(s) 104. The example environment 200 can include a service provider 202, network(s) 106, user device(s) 102, and charging device(s) 104. As shown, the service provider 202 can include one or more server(s) and/or other machines 204. In various webservice or cloud based embodiments, the service provider 202 can collect data from one or more users 206 associated with the user device(s) 102, analyze data associated with the user device(s) 102, and/or diagnose and remedy problems on the user device(s) 102 while the charging device(s) 104 are charging the user device(s) 102. That is, based at least in part on determining that a user device 102 communicatively couples to a charging device 104, the service provider 202 can access and/or receive data from one or more users 206 associated with the user device(s) 102, analyze data associated with the user device(s) 102, and/or diagnose and remedy problems on the user device(s) 102.

Additionally and/or alternatively, the service provider 202 can send data to the user device(s) 102 and/or charging device(s) 104 and can cause indications to be presented via at least one of the user device(s) 102 and/or the charging device(s) 104. For instance, in at least one example, the service provider 202 can send data to the user device(s) 102 and/or charging device(s) 104 and can cause recommendations including one or more actions that can be taken to improve the performance of the user device(s) 102 to be presented via at least one of the user device(s) 102 and/or the charging device(s) 104. In other examples, the service provider 202 can send data to the user device(s) 102 and/or charging device(s) 104 and can cause visual indications to be presented via at least one of the charging device(s) 104 and/or input/output devices 108. Light-emitting devices 110 associated with the charging device(s) 104 and/or input/output devices 108 can emit light, sometimes of various colors, to provide visual indications to users 206. Individual colors of the various colors can be associated with data having different sources and/or content.

In some examples, the network(s) 106 can be any type of network known in the art, such as the Internet. In other examples, the network(s) 106 may be, or may include, network(s) of telecommunication service provider(s), connectivity service providers, etc., as described above. The user device(s) 102 and/or charging device(s) 104 can communicatively couple to the network(s) 106 in any manner, such as by a global or local wired or wireless connection (e.g., local area network (LAN), intranet, etc.). The network(s) 106 can facilitate communication between the server(s) and/or other machines 204 and the user device(s) 102 and/or charging device(s) 104 associated with the users 206.

As described above, the network(s) 106 can provide updates to the charging device(s) 104 and/or important information to users 206 of the user device(s) 102 and/or charging device(s) 104. For instance, the network(s) 106 can provide OS and/or software updates and fixes that may be provided by manufacturers of the user device(s) 102 and/or service providers 202. Additionally, the network(s) 106 can facilitate the observance of the performance of the user device(s) 102 and/or charging device(s) 104 for learning about the performance of the user device(s) 102 and/or charging device(s) 104 and making improvements over time. Moreover, the network(s) 106 can collect usage and/or performance data from a plurality of users associated with the network(s) 106 for gaining intelligence and generating predictive models for predicting possible issues based on usage and/or performance of the user device(s) 102.

In some examples, the users 206 can operate corresponding user device(s) 102 to perform various functions associated with the user device(s) 102, which can include one or more processing unit(s) 208, computer-readable storage media 210, application(s) 212, and a display 214. Furthermore, the users 206 can utilize the user device(s) 102 to communicate with other users 206 via the network(s) 106.

User device(s) 102 can represent a diverse variety of device types and are not limited to any particular type of device, as described above. User device(s) 102 can include any type of computing device having one or more processing unit(s) 208 operably connected to computer-readable media 210 such as via a bus, which in some instances can include one or more of a system bus, a data bus, an address bus, a PCI bus, a Mini-PCI bus, and any variety of local, peripheral, and/or independent buses. The computer-readable media 210 can include one or more modules and data structures including, for example, a storage module 216, a presenting module 218, a healing module 220, a notifying module 221, and other modules, programs, or applications that are loadable and executable by processing units(s) 208. The one or more modules and data structures can be in the form of stand-alone applications, productivity applications, an OS component or any other application or software module having features that facilitate interactions between the user device(s) 102, the charging device(s) 104, and/or the service provider 202.

The user device(s) 102 can include application(s) 212. Application(s) 212 are created by programmers to fulfill specific tasks on user device(s) 102. For example, application(s) 212 can provide utility, entertainment, and/or productivity functionalities to users 206 of user device(s) 102. In at least one example, at least one of the application(s) 212 can query logs, parameters, and/or data to learn information about the user device(s) 102. In some examples, the at least one of the application(s) 212 can query various components associated with the user device(s) 102 to retrieve parameters stored for each of the various components. For instance, the at least one of the application(s) 212 can query a battery component of the user device(s) 102 to retrieve a parameter that communicates a level of the battery power. In other examples, the at least one of the application(s) 212 can query the storage module 216 for logs representative of activities performed by the respective user device(s) 102, as described below.

The at least one of the application(s) 212 can interact with the presenting module 218 to cause a prompt to be presented to a user 206 via a display 214 of a user device 102. The prompt can be based on a recommendation, as described below. The user 206 can interact with the prompt via the user device 102 to direct the healing module 220 to remedy issues affecting performance identified by the charging device 104, as described below.

Additionally and/or alternatively, the at least one of the application(s) 212 can communicate with a notifying module 221. The at least one of the application(s) 212 can send data to another application of the application(s) 212 that is associated with the light-emitting functionality described herein. The particular application that is associated with the light-emitting functionality described herein can send data to the notifying module 221 to direct light-emitting devices 110 associated with the charging device(s) 104 and/or the input/output devices 108 to emit light in one or more colors to provide visual indications to user(s) 206, as described below.

The storage module 216 can collect (e.g., access, receive, etc.) and store logs representative of activities of the user device(s) 102, data associated with the network(s) 106 (e.g., telecommunication service provider networks, connectivity networks, Internet, etc.), and/or demographic data about users 206 of user device(s) 102. Additionally and/or alternatively, the storage module 216 can collect data associated with application(s) 212 running on the user device 102, the OS running on the user device 102, core software running on the user device 102, hardware associated with the user device 102, etc. In at least one example, the storage module 216 can start collecting (e.g., accessing, receiving, etc.) logs and/or data based at least in part on determining that the user device 102 is communicatively connected with the charging device 104 and can stop collecting logs and/or data based at least in part on determining that the user device 102 is no longer communicatively connected with the charging device 104.

The storage module 216 can collect (e.g., access, receive, etc.) and store logs representative of activities of a corresponding user device 102 and/or user 206 associated with the user device 102. In some examples, the logs can include activity logs, debugging logs, etc. The activity logs can determine application(s) 212 that have been running on user device(s) 102, activities that users 206 take with respect to the application(s) 212, websites that the users 206 visit, words that the users 206 type, GPS locations that the users 206 visit, etc. Debugging logs can determine application(s) 212 that have been and/or are running on the user device(s) 102, activities that the users 206 take with respect to the application(s) 212, errors that have occurred while the application(s) 212 have been running, etc. The network data stored in the storage module 216 can include data representative of connections between the user device(s) 102 and the network(s) 106. The network data can provide information such as packet losses over time, connection interruptions, etc.

As described above, the storage module 212 can collect (e.g., access, receive, etc.) data associated with the network(s) 106 (e.g., telecommunication service provider networks, connectivity networks, Internet, etc.). For instance, the storage module 212 can collect data associated with off-device services and content, location status, network status and/or configurations, time of day, connectivity, etc. Moreover, the storage module 212 can collect data associated demographic data about the users 206 of the user device(s) 102, including, but not limited to, gender, age, occupation, residence, location of work, location of home, etc.

Additionally, the storage module 216 can collect data associated with application(s) 212 running on the user device 102 (i.e., application data), such as permissions associated with the application(s) 212, performance of the application(s) 212 running on the user device 102, amounts of data that individual of the application(s) 212 are using, application statuses of the application(s) 212, what data the application(s) 212 are accessing, crashes associated with individual application(s) 212, etc. At least some of the application data can be associated with the logs described above. The storage module 212 can collect data associated with the OS running on the user device 102 (i.e., OS data). For instance, the storage module 212 can access data associated with the current version of the OS, health checks associated with the OS, updates that are available for the OS, how the OS is performing, crashes associated with the OS, etc. Moreover, the storage module 212 can collect data associated with the core software running on the user device 102 (i.e., core software data), including, CPU performance, responses, health, status, etc., available updates, etc., and hardware associated with the user device 102 (i.e., hardware data), such as battery performance, lifecycle, health, status, etc., available updates, etc. Moreover, the storage module 216 can collect data associated with incoming and outgoing user device 102 traffic (e.g., to determine whether malware or viruses are affecting the user device 102), security alerts associated with the user device 102 and/or individual of the application(s) 212, etc.

In some examples, the storage module 216 may request permission before collecting and/or storing the logs representative of activities of the user device(s) 102, data associated with the network(s) 106, and/or demographic data about users 206. For instance, the storage module 216 may request to access information that includes personally identifiable information (PII) that identifies or can be used to identify, contact, or locate a person to whom such information pertains. In such examples, users 206 may be provided with notice that the systems and methods herein are collecting PII. Additionally, prior to initiating PII data collection, users 206 may have an opportunity to opt-in or opt-out of the PII data collection. For example, a user 206 may opt-in to the PII data collection by taking affirmative action indicating that he or she consents to the PII data collection. Alternatively, a user 206 may be presented with an option to opt-out of the PII data collection. An opt-out option may require an affirmative action to opt-out of the PII data collection, and in the absence of affirmative user action to opt-out, PII data collection may be impliedly permitted. In some examples, a user 206 may opt-in upon the first time that he or she connects a user device 102 to a corresponding charging device 104. In other examples, a user 206 may opt-in at other times, such as after a lapse of a predetermined period of time, at regular intervals of time, etc.

The storage module 216 may also leverage various security mechanisms to encrypt or otherwise protect the logs representative of activities of the user device(s) 102, data associated with the network(s) 106, and/or demographic data. The user device(s) 102 can provide the logs, parameters, and/or data to the charging device(s) 104 and/or the network(s) 106 for analyzing and/or making recommendations for remedying and/or preventing performance degradation in the user device(s) 102.

The presenting module 218 can communicate with the at least one of the application(s) 212 to cause recommendations to be presented to a user 206 for remedying and/or preventing performance degradation in the user device(s) 102, as described above. The presenting module 218 can cause a prompt to be presented to the user 106 via the display 214. In some examples, the prompt can include a list of one or more actions that can be taken to improve the performance of the user device(s) 102. In other examples, the prompt can include a general screen that presents users 206 with one or more options for remedying and/or preventing performance degradation in the user device(s) 102.

For instance, the prompt can provide the user 206 with an option to perform all actions to remedy and/or prevent performance degradation in the user device(s) 102, an option to deny all actions for remedying and/or preventing performance degradation in the user device(s) 102, or an option to view a specific screen. Additionally or alternatively, the prompt can provide the user 206 with an option to perform all actions recommended and to always perform all actions without future prompting, an option to deny all actions recommended and to always deny all actions without future prompting, or an option to always provide a specific screen. The specific screen can present users 206 with additional information for improving performance in his or her user device 102. For instance, the specific screen can comprise an itemized list of actions that a recommending module recommends be taken to remedy and/or prevent performance degradation in the user device(s) 102. For instance, the specific screen can include recommendations of application(s) to close or uninstall, settings to change to increase battery life, updates to download to improve performance, etc. The user 206 can selectively choose which actions to allow the healing module 220 to take and which actions to deny the healing module 220.

Based at least in part on the presenting module 218 causing the prompt to be presented to the user 206 via the application(s) 212, the healing module 220 can receive an indication of the user's 206 preference for remedying and/or preventing performance degradation in the user device(s) 102. Upon receiving an indication that the user 206 would like to take one or more actions recommended by a recommending module to remedy and/or prevent performance degradation of the user device(s) 102, the healing module 220 can effectuate the one or more actions. The indication from the user 206 can be in the form of user interaction with the display, such as selecting an option via a touch user interface, dictating an option via a spoken-language interface, etc. Based at least in part on receiving an indication from a user 206 to perform at least some of the actions recommended by a recommending module, the healing module 220 can effectuate corresponding actions. For instance, the healing module 220 can facilitate partially restarting the user device(s) 102, resetting or recharging the battery, closing down one or more application(s) 212 running in the background, deleting inactive application(s) 212, etc.

In additional and/or alternative examples, the presenting module 218 can generate and cause user interfaces to be presented to the users 206 via a display configured to communicate information about an OS running on a user device 102. For instance, the user interface can provide information about the current version of the OS, health checks associated with the OS, updates that are available for the OS, how the OS is performing, crashes associated with the OS, etc. Additionally and/or alternatively, the user interface can provide information about application(s) 212 that are running on a user device 102, such as how much data individual of the application(s) 212 are using, application statuses of the application(s), what data the application(s) 212 are accessing, crashes associated with individual application(s) 212, etc. Moreover, the user interface can provide information about security alerts associated with the user device 102 and/or individual of the application(s) 212, whether malware or viruses are affecting the user device 102, etc. Additionally and/or alternatively, the user interface can provide information about traffic going into and coming out of the user device 102, software and/or firmware updates that are available for the user device 102, battery health of the user device 102, etc.

The notifying module 221 can receive data from the service provider 202 and/or the application(s) 212 and can direct light-emitting devices 110 associated with the charging device(s) 104 and/or the input/output devices 108 to emit light in one or more colors to provide visual indicators to users 206 of the user device(s) 102, as described below.

In some examples, the users 206 can charge the user device(s) 102 via charging device(s) 104. As described above, the charging device(s) 104 can have basic charging functionality provided by wired charging devices, wireless charging devices, etc. The charging device(s) 104 can have additional and/or alternative functionality including but not limited to terminating AC power after determining that a corresponding user device 102 is charged, analyzing logs, parameters, and/or data, and/or communicating information to users 106 via a display, described below, and/or light-emitting devices 108, etc. That is, a user 206 can use a charging device 104, as described herein, to charge his or her user device 102, receive information about his or her user device 102, and improve the performance of his or her user device 102.

In at least one example, the charging device(s) 104 can be associated with authentication data for authorizing the user device(s) 102 to communicate with the charging device(s) 104. In additional and/or alternative examples, the user device(s) 102 can be associated with authentication data for authorizing the charging device(s) 104 to communicate with the user device(s) 102. In some examples, the user device(s) 102 and/or charging device(s) 104 can authenticate the charging device(s) 104 and/or user device(s) 102, respectively, before transmitting data between the charging device(s) 104 and/or user device(s) 102. In at least one example, the charging device(s) 104 can be associated with an optical sensor. The optical sensor can pair with one or more of the application(s) 212 and may associate a corresponding charging device 104 with a user identification, Bluetooth pairing, WiFi networks, etc. The user identification can be associated with a profile corresponding to a user 206. The profile can be stored in a service provider database, as described below.

The charging device(s) can include one or more processing unit(s) 222 and computer-readable media 224. In some examples, the charging device(s) 104 can include a display 226 (e.g., liquid crystal display (LCD), Organic Light Emitting Diode (OLED), etc.) and/or a light-emitting devices 110 for communicating information to users 206. The charging device(s) 104 can represent a diverse variety of device types and are not limited to any particular type of charging device, as described above. In at least one example, the charging device(s) 104 can include one or more input/output devices 108 to communicatively couple and/or transmit data between a corresponding user device 102 and charging device 104. The charging device(s) 104 can include any type of charging device having one or more processing unit(s) 222 operably connected to computer-readable media 224 such as via a bus, which in some instances can include one or more of a system bus, a data bus, an address bus, a PCI bus, a Mini-PCI bus, and any variety of local, peripheral, and/or independent buses.

The computer-readable media 224 can include one or more modules and data structures including, for example, a communicating module 228, an analyzing module 230, a recommending module 232, and other modules, programs, or applications that are loadable and executable by processing units(s) 222. The one or more modules and data structures can be in the form of stand-alone applications, productivity applications, an OS component or any other application or software module having features that facilitate interactions between the user device(s) 102, the charging device(s) 104, and/or the service provider.

In some examples, the executable instructions stored on computer-readable media 224 can additionally and/or alternatively include a presenting module 218 and/or a notifying module 221 to perform functionality similar to the functionality performed by the presenting module 218 and notifying module 221, described above. That is, computer-readable media 224 can include a presenting module 218 for causing a prompt to be displayed on the display 226 of the charging device 104 and/or a notifying module 221 for receiving data from the service provider 202 and/or the application(s) 212 and directing light-emitting devices 110 associated with the charging device(s) 104 and/or the input/output devices 108 to emit light in one or more colors to provide visual indications to users 206, as described below. In other examples, the presentation module 218 and/or the notifying module 221 can communicate with the display 226 or light-emitting devices 110, respectively, from their location on the user devices 102.

The communicating module 228 stored on the charging device(s) 104 can send and receive data from the user device(s) 102. For instance, the communicating module 228 can access and/or receive the logs, parameters, and/or data from the user device(s) 102. The data can include network data, user demographic data from the user device(s) 102, data associated with application(s) 212 running on the user device 102, data associated with the OS running on the user device 102, data associated with core software running on the user device 102, data associated with hardware associated with the user device 102, etc., as described above. The communicating module 228 can also receive data from the user device(s) 102 indicating whether a user 206 takes steps recommended by a recommending module (e.g., recommending module 232 and/or recommending module 246). The communicating module 228 can send recommendations from a recommending module (e.g., recommending module 232 and/or recommending module 246) to the user device(s) 102.

The communicating module 228 stored on the charging device(s) 104 can also send and receive data from the network(s) 106. In some examples, the communicating module 228 can send the logs, parameters, and/or data from the user device(s) 102 to the network(s) 106 for collection and/or analyzing by the service provider 202. The communicating module 228 can receive data from the network(s) 106 such as demographic data and usage pattern data derived from a plurality of users 206 associated with a plurality of user device(s) 102 that are communicatively coupled to the network(s) 106. Additionally, the communicating module 228 can receive predictive models trained and sent by server(s) and/or other machines 204 associated with the network(s) 106 and updates to the predictive models in predetermined time intervals. In some examples, the communicating module 228 can receive recommendations from the network(s) 106 based at least in part on the logs, parameters, and/or data the communicating module 228 stored on the charging device(s) 104 received from the user device(s) 102 and sent to the network(s) 106.

The analyzing module 230 stored on the charging device(s) 104 can process the logs, parameters, and/or data from the user device(s) 102. In some examples, the analyzing module 230 can scan through the logs, parameters, and/or data received from the user device(s) 102 to identify bad mapping that may have affected and/or may be affecting the performance of the user device(s) 102. The analyzing module 230 can identify bad mapping by comparing standard logs, parameters, and/or data associated with the user device(s) 102 with the logs, parameters, and/or data received from the user device(s) 102. The standard logs, parameters, and/or data can be derived from factory settings and/or data collected from the network(s) 106. In at least one example, the standard logs, parameters, and/or data can be regularly updated based on updates received from the network(s) 106 and/or machine learning associated with logs, parameters, and/or data collected from a plurality of users associated with the network(s) 106. By comparing the logs, parameters, and/or data from the user device(s) to the standard logs, parameters, and/or data stored in the analyzing module 230, the analyzing module 230 can identify issues that may be affecting performance of the user device(s) 102.

The analyzing module 230 can determine diagnostic data identifying the issues that may be affecting performance of the user device(s) 102 and can provide the diagnostic data to the recommending module 232 stored on the charging device(s) 104. For instance, the analyzing module 230 can analyze the data associated with off-device services and content, location status, network status and/or configurations, time of day, connectivity, etc., to determine the status of the off-device services and content, location problems, network problems, connectivity problems, etc. Additionally, the analyzing module 230 can analyze the data associated with application(s) 212 running on the user device 102, to determine which application(s) 212 are consuming the largest amounts of data, which application(s) 212 are crashing and/or are non-responsive, what type of data the application(s) 212 are accessing, the status of the individual application(s) 212, etc.

The analyzing module 230 can analyze data associated with the OS running on the user device 102 to determine the current version of the OS, the health of the OS, whether updates are available for the OS, how the OS is performing, crashes associated with the OS, etc. Moreover, the analyzing module 230 can analyze the data associated with the core software running on the user device 102, to determine CPU performance, responses, health, status, etc., whether any core software updates are available, etc. Additionally, the analyzing module 230 can analyze data associated with the hardware associated with the user device 102, to determine battery performance, lifecycle, health, status, etc., whether there are updates available, etc. Moreover, the analyzing module 230 can analyze the data associated with incoming and outgoing user device 102 traffic to determine whether malware or viruses are affecting the user device 102, whether security alerts associated with the user device 102 and/or individual of the application(s) 212 are available, etc.

The analyzing module 230 can also proactively identify issues that may affect performance of the user device(s) 102 based on predictive models trained in the server(s) and/or other machines 204 associated with the network(s) 106, as described below. The analyzing module 230 can leverage the predictive models for processing the logs, parameters, and/or data from the user device(s) 102 to identify usage patterns associated with the user 206 of the user device(s) 102 that may affect performance of the user device(s) 102. The analyzing module 230 can determine diagnostic data identifying the issues that may be affecting performance of the user device(s) 102 to the recommending module 232.

In at least one example, the analyzing module 230 stored on the charging device(s) 104 can perform all of the analysis on the charging device(s) 104. In other examples, the analyzing module 230 stored on the charging device(s) 104 can perform some of the analysis on the charging device(s) 104 and can offload some of the analysis to the server(s) and/or other machines 204. In such examples, the communicating module 228 stored on the charging device(s) 104 can receive diagnostic data based on analysis performed by server(s) and/or other machines 204 associated with the network(s) 106. In yet other examples, the analyzing module 230 stored on the charging device(s) 104 may not perform any analysis on the charging device(s) 104 and the charging device(s) 104 can send the logs, parameters, and/or data from the user device(s) 102 to the server(s) and/or other machines 204 associated with the network(s) 106.

The recommending module 232 stored on the charging device(s) 104 can send recommendations to the presenting module 218 for remedying issues affecting performance and/or potential issues that may affect performance. For instance, the recommending module 232 can receive the diagnostic data identifying the issues that may be affecting performance of the user device(s) 102. The recommending module 232 can leverage the diagnostic data to determine actions the user 206 can take with respect to the user device 102 to remedy and/or prevent performance degradation. In at least some examples, the recommending module 232 may generate options for remedying and/or preventing performance degradation in the user device(s) 102 and instructions for implementing the options that may be executed by the user device 102 receiving the instructions.

The recommending module 232 can utilize various techniques to filter through the diagnostic data in order to determine which data to include in the recommendations. For instance, in at least one example, the recommending module 232 can leverage one or more machine learning algorithms to determine diagnostic data items that, when corresponding remedying actions are taken, can cause the greatest improvement to the performance of the user device(s) 102. The machine learning algorithms can include supervised machine learning algorithms (e.g., Gaussian process regression, support vector machines, k-nearest neighbor, decision trees, Bayesian networks, etc.), unsupervised machine learning algorithms (e.g., artificial neural networks, association rule learning, hierarchical clustering, cluster analysis, etc.), deep learning machine learning algorithms, etc. In some examples, the recommending module 232 can rank different diagnostic data items based at least in part on identifying the diagnostic data items that, when corresponding remedying actions are taken, can cause the greatest improvement to the performance of the user device(s) 102. The recommending module 232 can recommend actions corresponding to a predetermined number of top ranking diagnostic data items or actions corresponding to a number of diagnostic data items that can make an improvement to the performance of the user device(s) 102 that is above a threshold level.

Additionally and/or alternatively, the recommending module 232 can leverage one or more machine learning algorithms to determine combinations of diagnostic data items that, when corresponding remedying actions are taken, can cause the greatest improvement to the performance of the user device(s) 102. In such examples, the recommending module 232 can recommend actions corresponding to combinations of actions that can cause the greatest improvement to the performance of the user device(s) 102.

The recommending module 232 can output the recommendations to the presenting module 218. In at least one example, the recommending module 232 can output the recommendations to the communicating module 228 and the communicating module 228 can send the recommendations to the presenting module 218. In additional and/or alternative examples, the recommending module 232 can send diagnostic data to the particular application of the application(s) 212 that is associated with the light-emitting functionality and the particular application can send data to the notifying module 221 to direct light-emitting devices 110 associated with the charging device(s) 104 and/or the input/output devices 108 to emit light in particular colors to provide visual indications associated with the diagnostic data.

In at least one example, the presenting module 218 can be associated with the user device(s) 102 for causing a prompt to be displayed on the display 214 (e.g., liquid crystal display (LCD), Organic Light Emitting Diode (OLED), etc.) associated with the user device(s) 102. In other examples, however, the presenting module 218 can be associated with the charging device(s) 104 for causing a presentation (e.g., a user interface, etc.) to be displayed on the display 226 associated with the charging device(s) 104.

The service provider 202 can be any entity, server(s), platform, etc., that can collect data from one or more users 206 associated with the one or more user device(s) 102, analyze data associated with the one or more user device(s) 102, and/or diagnose and remedy problems on the one or more user device(s) 102 while corresponding charging device(s) 104 charge the user device(s) 102. Moreover, and as shown, the service provider 102 can include one or more server(s) and/or other machines 204, which can include one or more processing unit(s) 234 and computer-readable media 236. The one or more server(s) and/or other machines 204 can include devices.

Examples support scenarios where device(s) that can be included in the one or more server(s) and/or other machines 204 can include one or more computing devices that operate in a cluster or other grouped configuration to share resources, balance load, increase performance, provide failover support or redundancy, or for other purposes. Device(s) included in the one or more server(s) and/or other machines 204 can belong to a variety of categories or classes of devices such as traditional server-type devices, desktop computer-type devices, mobile devices, special purpose-type devices, embedded-type devices, and/or wearable-type devices. Thus, although illustrated as server computers, device(s) can include a diverse variety of device types and are not limited to a particular type of device. Device(s) included in the one or more server(s) and/or other machines 204 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) that can be included in the one or more server(s) and/or other machines 204 can include any type of computing device having one or more processing unit(s) 234 operably connected to computer-readable media 236 such as via a bus, which in some instances can include one or more of a system bus, a data bus, an address bus, a PCI bus, a Mini-PCI bus, and any variety of local, peripheral, and/or independent buses. The computer-readable media 236 can include one or more modules and data structures including, for example, collecting module 238, learning module 240, and other modules, programs, or applications that are loadable and executable by processing units(s) 234. In at least one example, the one or more server(s) and/or other machines 204 can additionally or alternatively include a communicating module 242, analyzing module 244, and/or recommending module 246 for performing at least some of the functions described above with respect to the communicating module 228, analyzing module 230, and recommending module 232 stored on the charging device(s) 104. The one or more modules and data structures can be in the form of stand-alone applications, productivity applications, an OS component or any other application or software module having features that facilitate interactions between the user device(s) 102, the charging device(s) 104, and/or the service provider 202.

The collecting module 238 can collect (e.g., access, receive, etc.) data associated with a plurality of users 206 of a plurality of user device(s) 102 associated with the network(s) 106. The collecting module 238 can collect demographic data from the users 206 such as gender, age, profession, geographic locations, travel patterns, etc. The collecting module 238 can also collect activity logs and/or debugging logs from user devices that are communicatively coupled to the network(s) 106, such as user device(s) 102. The activity logs and/or demographic data can be used to determine usage patterns such as applications that a user can run on his or her device, combinations of applications that a user regularly runs simultaneously on his or her device, locations where the user typically uses his or her device, times of a day the user typically uses his or her device, etc. The debugging logs from user device(s) 102 that are communicatively coupled to the network(s) 106 can be used to correlate usage patterns with issues that cause degradation of performance on the user device(s) 102. Additionally and/or alternatively, the collecting module 238 can collect application data, OS data, core software data, hardware data, etc., as described above. The collecting module 238 can collect the data by directly communicating with the user device(s) 102 or indirectly communicating with the user device(s) through the charging device(s) 104.

In some examples, the collecting module 238 may request permission before collecting and/or storing data associated with a plurality of users 206 of the plurality of user device(s) 102 associated with the network(s) 106. For instance, the collecting module 238 may request to access information that includes personally identifiable information (PII) that identifies or can be used to identify, contact, or locate a person to whom such information pertains. In such examples, a user 206 may be provided with notice that the systems and methods herein are collecting PII. Additionally, prior to initiating PII data collection, users 206 may have an opportunity to opt-in or opt-out of the PII data collection. For example, a user 206 may opt-in to the PII data collection by taking affirmative action indicating that he or she consents to the PII data collection. Alternatively, a user 206 may be presented with an option to opt-out of the PII data collection. An opt-out option may require an affirmative action to opt-out of the PII data collection, and in the absence of affirmative user action to opt-out, PII data collection may be impliedly permitted. The collecting module 238 may also leverage various security mechanisms to encrypt or otherwise protect data associated with the plurality of users 206 of the plurality of user device(s) 102 that may be stored in the collecting module 238.

The database 239 may organize and store at least some logs and/or data collected by the storage module 216 and/or the collecting module 238. In at least one example, the database 239 can include one or more user profiles and data associated with users 206 and/or user device(s) 102 corresponding to the user profiles can be mapped to the one or more user profiles. Each user profile can correspond with a user identifier, described above. In some examples, a user profile may include information associated with a user 206 such as demographic data associated with the user 206, account information associated with a user 206, logs and/or data accessed and/or received from a user device 102 corresponding to the user 206 and/or a corresponding charging device 104, etc.

The learning module 240 can leverage machine learning to develop predictive models based on the demographic data, usage patterns, and/or issues that cause degradation of performance on the user device(s) 102. The learning module 240 can provide the predictive models to the analyzing module 244 stored in the server(s) and/or other machines 204 for identifying issues that can reduce the efficiency of user device performance based on logs, parameters, and/or other data received from the user device(s) 102. In some examples, the learning module 240 can send the predictive models to the charging device(s) 104 so that the analyzing module 230 stored on the charging device(s) 104 can process the logs, parameters, and/or other data received from the user device(s) 102 on the charging device(s) 104 using the predictive models.

The collecting module 238 can collect new data from the users 206 of the plurality of user device(s) 102 over time and the learning module 240 can leverage the new data to update the predictive models. In examples where the learning module 240 sends the predictive models to the charging device(s) 104, the learning module 240 can send the updates to the charging device(s) 104 for updating the predictive models stored on the charging device(s) 104. The learning module 240 can send the updates to the charging device(s) 104 in predetermined time intervals (e.g., hourly, daily, monthly, etc.).

The communicating module 242 stored on the server(s) and/or other machines 204 can send and receive data from the user device(s) 102 and/or the charging device(s) 104. For instance, the communicating module 242 can receive the logs, parameters, and/or data from the user device(s) 102. The data can include network data and/or user demographic data from the user device(s) 102, as described above. The communicating module 242 can also receive data from the user device(s) 102 indicating whether a user 206 takes steps recommended by a recommending module (e.g., recommending module 232 and/or recommending module 246). Additionally and/or alternatively, the communicating module 242 can send recommendations from a recommending module (e.g., recommending module 232 and/or recommending module 246) to the user device(s) 102.

The communicating module 242 stored on server(s) and/or other machines 204 can also exchange data with the charging device(s) 104. In some examples, the communicating module 242 can receive the logs, parameters, and/or data from the user device(s) 102 from the charging device(s) 104 for collecting and/or analyzing. The communicating module 242 can send data collected by the collecting module 238 such as demographic data and usage pattern data derived from a plurality of users 206 associated with a plurality of user device(s) 102 that are communicatively coupled to the network(s) 106. Additionally, the communicating module 242 can send predictive models trained in the learning module 240 and updates to the predictive models in predetermined time intervals. In some examples, the communicating module 242 can send recommendations to the charging device(s) 104 based at least in part on the logs, parameters, and/or data the communicating module 242 received from the user device(s) 102.

In additional and/or alternative examples, the communicating module 242 can send data to the application(s) 212 and/or notifying module 221 to direct light-emitting devices 110 associated with the charging device(s) 104 and/or the input/output devices 108 to emit light in one or more colors to provide visual indications to users 206 of the user device(s) 102, as described below.

The analyzing module 244 stored on the server(s) and/or other machines 204 can process the logs, parameters, and/or data from the user device(s) 102. In some examples, the analyzing module 244 can scan through the logs, parameters, and/or data received from the user device(s) 102 to identify bad mapping that may have affected and/or may be affecting the performance of the user device(s) 102. The analyzing module 244 can identify bad mapping by comparing standard logs, parameters, and/or data associated with the user device(s) 102 with the logs, parameters, and/or data received from the user device(s) 102. The standard logs, parameters, and/or data can be derived from factory settings and/or data collected from the network(s) 106. In at least one example, the standard logs, parameters, and/or data can be regularly updated based on updates received from the network(s) 106 and/or machine learning associated with logs, parameters, and/or data collected from a plurality of users associated with the network(s) 106. By comparing the logs, parameters, and/or data from the user device(s) to the standard logs, parameters, and/or data stored in the analyzing module 244, the analyzing module 244 can identify issues that may be affecting performance of the user device(s) 102.

The analyzing module 244 can determine diagnostic data identifying the issues that may be affecting performance of the user device(s) 102 to the recommending module 232 stored on the charging device(s) 104 and/or the recommending module 246 stored on the server(s) and/or other machines 204. For instance, as described above in the context of analyzing module 232, the analyzing module 244 can analyze the data associated with off-device services and content, location status, network status and/or configurations, time of day, connectivity, etc., to determine the status of the off-device services and content, location problems, network problems, connectivity problems, etc. Additionally, the analyzing module 244 can analyze the data associated with application(s) 212 running on the user device 102, to determine which application(s) 212 are consuming the largest amounts of data, which application(s) 212 are crashing and/or are non-responsive, what type of data the application(s) 212 are accessing, the status of the individual application(s) 212, etc.

The analyzing module 244 can analyze data associated with the OS running on the user device 102 to determine the current version of the OS, the health of the OS, whether updates are available for the OS, how the OS is performing, crashes associated with the OS, etc. Moreover, the analyzing module 244 can analyze the data associated with the core software running on the user device 102, to determine CPU performance, responses, health, status, etc., whether any core software updates are available, etc. Additionally, the analyzing module 244 can analyze data associated with the hardware associated with the user device 102, to determine battery performance, lifecycle, health, status, etc., whether there are updates available, etc. Moreover, the analyzing module 244 can analyze the data associated with incoming and outgoing user device 102 traffic to determine whether malware or viruses are affecting the user device 102, whether security alerts associated with the user device 102 and/or individual of the application(s) 212 are available, etc.

The analyzing module 244 can also proactively identify issues that may affect performance of the user device(s) 102 based on predictive models trained in the learning module 240. The analyzing module 244 can leverage the predictive models for processing the logs, parameters, and/or data from the user device(s) 102 to identify usage patterns associated with the user 206 of the user device(s) 102 that may affect performance of the user device(s) 102. The analyzing module 244 can determine diagnostic data identifying the issues that may be affecting performance of the user device(s) 102 to the recommending module 232 stored in the charging device(s) 104 and/or the recommending module 246 stored in the server(s) and/or other machines 204.

As described above, the analyzing module 230 stored on the charging device(s) 104 can perform all of the analysis on the charging device(s) 104. In other examples, the analyzing module 230 stored on the charging device(s) 104 can perform some of the analysis on the charging device(s) 104 and can offload some of the analysis to the analyzing module 244 stored on the server(s) and/or other machines 204. The communicating module 242 can send diagnostic data to the charging device(s) 104 based on analysis performed by analyzing module 230 stored on the server(s) and/or other machines 204 associated with the network(s) 106. In yet other examples, the analyzing module 230 stored on the charging device(s) 104 may not perform any analysis on the charging device(s) 104 and the analyzing module 244 stored on the server(s) and/or other machines 204 can process the logs, parameters, and/or data from the user device(s) 102.

The recommending module 246 stored on the server(s) and/or other machines 204 can send recommendations for remedying issues affecting performance and/or potential issues that may affect performance to the communicating module 228 stored on the charging device(s) 104. For instance, the recommending module 246 can receive the diagnostic data identifying the issues that may be affecting performance of the user device(s) 102. The recommending module 246 can leverage the diagnostic data to determine actions a user 206 can take with respect to a user device 102 to remedy and/or prevent performance degradation. In at least some examples, the recommending module 246 may generate options for remedying and/or preventing performance degradation in the user device(s) 102 and instructions for implementing the options that may be executed by the user device 102 receiving the instructions. The recommending module 246 can leverage various techniques to filter through the diagnostic data in order to determine which data to include in the recommendations, as described above in the context of recommending module 232.

The recommending module 246 can output the recommendations to the charging device(s) 104 for outputting to the presenting module 218. In at least one example, the recommending module 246 can output the recommendations to the communicating module 242 and the communicating module 242 can send the recommendations to the presenting module 218. In at least one example, as shown in FIG. 2, the presenting module 218 can be associated with the user device(s) 102 for causing a prompt to be displayed on the display 214 associated with the user device(s) 102. In other examples, however, the presenting module 218 can be associated with the charging device(s) 104 for causing a presentation to be displayed on the display 226 associated with the charging device(s) 104. In additional and/or alternative examples, the recommending module 246 can send data associated with the recommendations to the application(s) 212 and the application(s) 212 can send data to the notifying module 221 to direct light-emitting devices 110 associated with the charging device(s) 104 and/or the input/output devices 108 to emit light in one or more colors to provide visual indications to users 206 of the user device(s) 102.

Alternatively, or in addition, the functionality described herein can be performed, at least in part, by one or more hardware logic components or accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Device(s) that can be included in the one or more server(s) and/or other machines 204 can further include one or more input/output (I/O) interface(s) coupled to the bus to allow device(s) to communicate with other devices such as user input peripheral devices (e.g., a keyboard, a mouse, a pen, a game controller, a voice input device, a touch input device, gestural input device, an image camera, a depth sensor, and the like) and/or output peripheral devices (e.g., a display, a printer, audio speakers, a haptic output, and the like). Devices that can be included in the one or more server(s) and/or other machines 204 can also include one or more network interfaces coupled to the bus to enable communications between computing devices and other networked devices such as user device(s) 102. Such network interface(s) can include one or more network interface controllers (NICs) or other types of transceiver devices to send and receive communications over a network. For simplicity, some components are omitted from the illustrated devices.

Processing unit(s) 208, 222, and/or 234 can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various embodiments, the processing unit(s) 208, 222, and/or 234 can execute one or more modules and/or processes to cause the user device(s) 102, charging device(s) 104, and/or server(s) and/or other machines 204, respectively, to perform a variety of functions, as set forth above and explained in further detail in the following disclosure. Additionally, each of the processing unit(s) 208, 222, and/or 234 can possess its own local memory, which also can store program modules, program data, and/or one or more OSs.

In at least one configuration, the computer-readable media 210, 224, and/or 236 of the user device(s) 102, charging device(s) 104, and server(s) and/or other machines 204, respectively, can include components that facilitate interaction between the service provider 202 and the user device(s) 102 and/or charging device(s) 104. For example, the computer-readable media 210, 224, and/or 236 can include modules that can be implemented as computer-readable instructions, various data structures, and so forth via at least one processing unit(s) 208, 222, and/or 234, respectively, to configure a device to execute instructions and to perform operations for diagnosing and remedying problems on user devices (e.g., user device(s) 102) via self-healing charging devices (e.g., charging device(s) 104). Functionality to perform these operations can be included in multiple devices or a single device.

Depending on the exact configuration and type of the user device(s) 102, charging device(s) 104, and/or one or more server(s) and/or other machines 204, the computer-readable media 210, 224, and/or 236, respectively, can include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media includes computer readable instructions, data structures, program modules, or other data in a modulated data signal, such as a carrier wave, or other transmission mechanism. As defined herein, computer storage media does not include communication media.

In at least one example, the computer storage media can include non-transitory computer-readable media. Non-transitory computer-readable media may include volatile and nonvolatile, removable and non-removable tangible, physical media implemented in technology for storage of information, such as computer readable instructions, data structures, program modules, or other data. Computer-readable media 210, computer-readable media 224, and computer-readable media 236 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 102, charging device 104, or server(s) and/or other machines 204. Any such non-transitory computer-readable media may be part of the user device 102, charging device 104, or server(s) and/or other machines 204.

Example Processes

Figure 3:
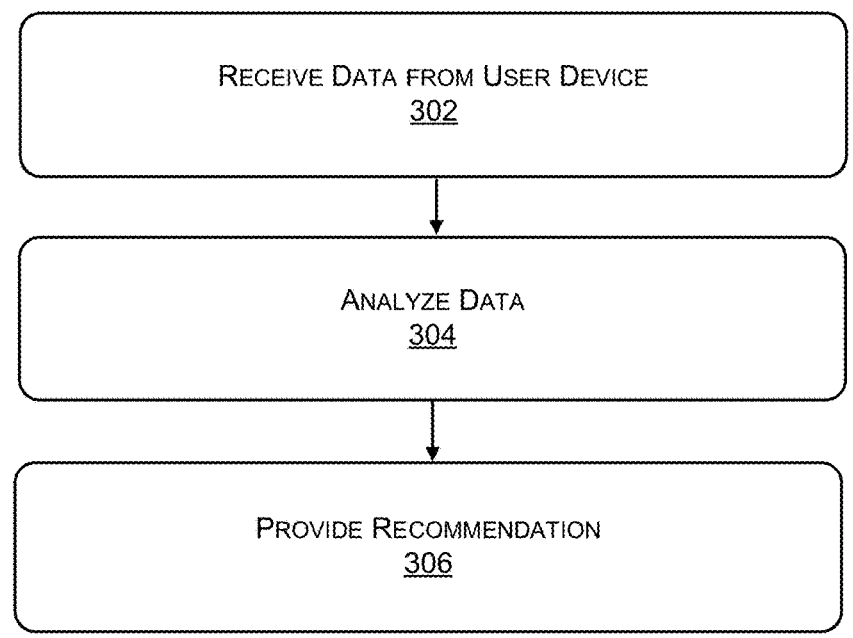
FIG. 3 is a flow diagram that shows an example process for diagnosing and remedying problems on user devices via self-healing charging devices.

FIG. 3 is a flow diagram that shows an example process 300 for diagnosing and remedying problems on user device(s) 102 via self-healing charging device(s) 104.

Block 302 illustrates receiving data from a user device 102 connected to a charging device 104. A user 206 can communicatively connect a user device 102 to a charging device 104. In some examples, if the charging device 104 is a wired charging device, the user 206 can physically connect the user device 102 and the charging device 104, for example by one of the input/output devices 108. In other examples, if the charging device 104 is a wireless charging device, the user can associate the user device 102 and charging device 104 such to charge the user device 102 by inductive coupling, conductive recharging mats, radio transmission, WiFi, Baseband, Bluetooth®, etc.

Based at least in part on the user device 102 detecting a connection to the charging device 104, an application 212 can query logs, parameters, and/or data on the user device 102. As described above, in some examples, the application(s) 212 can query various components associated with the user device 102 to retrieve parameters stored for each of the various components. In other examples, the application(s) 212 can query the storage module 216 for logs representative of activities performed by the respective user device 102. The user device 102 can send the logs, parameters, and/or data to the charging device 104. As described above, the data can include network data, demographic data, application data, OS data, core software data, hardware data, etc. The communicating module 228 can receive the logs, parameters, and/or data at the charging device 104.

Block 304 illustrates analyzing the data. The analyzing module 230 stored on the charging device 104 can process the logs, parameters, and/or data from the user device 102. In some examples, the analyzing module 230 can scan through the logs, parameters, and/or data received from the user device 102 to identify bad mapping that can have affected and/or can be affecting the performance of the user device 102. The analyzing module 230 can identify bad mapping by comparing standard logs, parameters, and/or data associated with the user device(s) 102 with the logs, parameters, and/or data from the user device 102. The standard logs, parameters, and/or data can be derived from factory settings and/or data collected from the network(s) 106, as described above. By comparing the logs, parameters, and/or data from the user device 102 to the standard logs, parameters, and/or data stored in the analyzing module 230, the analyzing module 230 can identify issues that can be affecting performance of the user device 102.

The analyzing module 230 can determine diagnostic data identifying the issues that may be affecting performance of the user device 102 to the recommending module 232 stored on the charging device 104. For instance, the analyzing module 230 can analyze the data associated with off-device services and content, location status, network status and/or configurations, time of day, connectivity, etc., to determine the status of the off-device services and content, location problems, network problems, connectivity problems, etc. Additionally, the analyzing module 230 can analyze the data associated with application(s) 212 running on the user device 102, to determine which application(s) 212 are consuming the largest amounts of data, which application(s) 212 are crashing and/or are non-responsive, what type of data the application(s) 212 are accessing, the status of the individual application(s) 212, etc.

The analyzing module 230 can analyze data associated with the OS running on the user device 102 to determine the current version of the OS, the health of the OS, whether updates are available for the OS, how the OS is performing, crashes associated with the OS, etc. Moreover, the analyzing module 230 can analyze the data associated with the core software running on the user device 102, to determine CPU performance, responses, health, status, etc., whether any core software updates are available, etc. Additionally, the analyzing module 230 can analyze data associated with the hardware associated with the user device 102, to determine battery performance, lifecycle, health, status, etc., whether there are updates available, etc. Moreover, the analyzing module 230 can analyze the data associated with incoming and outgoing user device 102 traffic to determine whether malware or viruses are affecting the user device 102, whether security alerts associated with the user device 102 and/or individual of the application(s) 212 are available, etc.

The analyzing module 230 stored in the charging device 104 can also identify issues that may affect performance of the user device 102 based on predictive models trained in the server(s) and/or other machines 204 associated with the network(s) 106, as described below. The analyzing module 230 can leverage the predictive models for processing the logs, parameters, and/or data from the user device 102 to identify usage patterns associated with the user 206 of the user device 102 that may affect performance of the user device 102.

Block 306 illustrates providing a recommendation. The recommending module 232 stored on the charging device 104 can receive diagnostic data based on analyzing the logs, parameters, and/or data from the user device 102. The diagnostic data can identify issues that may be affecting performance of the user device 102 and the recommending module 232 can leverage the diagnostic data to determine actions the user can take with respect to the user device 102 to remedy and/or prevent performance degradation. In at least some examples, the recommending module 232 may generate options for remedying and/or preventing performance degradation in the user device 102 and instructions for implementing the options that may be executed by the user device 102 receiving the instructions. The recommending module 232 can utilize various techniques to filter through the diagnostic data in order to determine which data to include in the recommendations, as described above.

The recommending module 232 can output the recommendations to the presenting module 218. As described above, while the presenting module 218 is illustrated in FIG. 2 as being associated with the user device 102, in some examples, a presenting module 218 can additionally or alternatively be stored on the charging device 104. As described above, the presenting module 218 may cause user interfaces configured to present the recommendations to be displayed via display 214 and/or display 226.

In additional and/or alternative examples, the recommending module 232 can send data associated with the recommendations to the application(s) 212 and a particular application associated with the light-emitting functionality can send data to the notifying module 221 to direct the light-emitting devices 110 associated with the charging device(s) 104 and/or the input/output devices 108 to emit light in one or more colors to provide visual indicators to the users 206. In at least one example, as described below, the light-emitting devices 110 associated with a charging device 104 and/or the input/output devices 108 can emit light in a particular color to provide a visual indicator to a user 206 that one or more actions can be taken to improve the performance of the user device 102.

Figure 4:
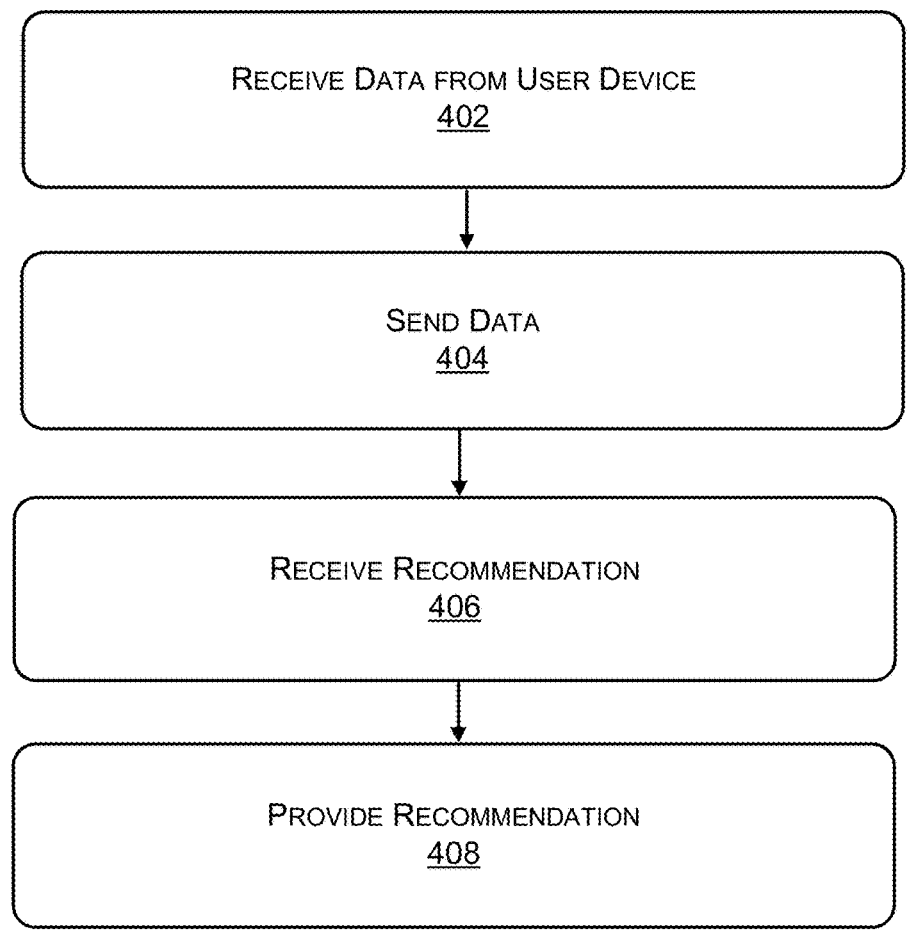
FIG. 4 is a flow diagram that shows another example process for diagnosing and remedying problems on user devices via self-healing charging devices.

FIG. 4 is a flow diagram that shows another example process 400 for diagnosing and remedying problems on user device(s) 102 via self-healing charging device(s) 104.

Block 402 illustrates receiving data from a user device 102 connected to a charging device 104. Based at least in part on the user device 102 detecting a connection to the charging device 104, an application 212 can query logs, parameters, and/or data on the user device 102. The user device 102 can send the logs, parameters, and/or data to the charging device 104. As described above, the data can include network data, demographic data, application data, OS data, core software data, hardware data, etc.

Block 404 illustrates sending data. The communicating module 228 stored on the charging device 104 can send the logs, parameters, and/or data from the user device 102 to the server(s) and/or other machines 204 associated with the network(s) 106. The logs, parameters, and/or data from the user device 102 can be received by a communicating module 242 stored on the server(s) and/or other machines 204 associated with the network(s) 106 and the communicating module 242 can provide the logs, parameters, and/or data from the user device 102 to an analyzing module 244 stored on the server(s) and/or other machines 204.

The analyzing module 244 can process the logs, parameters, and/or data from the user device 102. For instance, the analyzing module 244 can process the data by scanning user device data received from the user device 102 to identify causes of performance degradation in the user device 102 and/or comparing the user data received from the user device 102 with the network data received from the network 106 to predict causes of performance degradation. Additionally and/or alternatively, the analyzing module 244 can process the application data, OS data, core software data, hardware data, etc. to predict causes of performance degradation, as described above. In some examples, the logs, parameters, and/or data from the user device 102 can also be stored in the collecting module 238 for training and/or updating predictive models.

Block 406 illustrates receiving a recommendation. The recommending module 246 stored on the server(s) and/or other machines 204 associated with the network(s) 106 can receive diagnostic data identifying the issues that may be affecting performance of the user device 102 from the analyzing module 244. Based at least in part on receiving the diagnostic data from the analyzing module 244, the recommending module 246 can formulate recommendations for remedying and/or preventing performance degradation. In at least some examples, the recommending module 246 may generate options for remedying and/or preventing performance degradation in the user device 102 and instructions for implementing the options that may be executed by the user device 102 receiving the instructions. As described above, the recommending module 246 can leverage various techniques for filtering the data to determine which diagnostic data to include in the recommendations. The recommending module 246 can output a recommendation to the communicating module 242 for sending the recommendation to the charging device 104. The communicating module 228 on the charging device 104 can receive the recommendation and provide the recommendation to the recommending module 232 on the charging device 104.

Block 408 illustrates providing the recommendation. The recommending module 232 stored on the charging device 104 can output the recommendations to the presenting module 218, as described above. As described above, the presenting module 218 may cause user interfaces configured to present the recommendations to be displayed via display 214 and/or display 226.

In additional and/or alternative examples, the recommending module 232 can send data associated with the recommendations to the application(s) 212 and a particular application associated with the light-emitting functionality can send data to the notifying module 221 to direct the light-emitting devices 110 associated with the charging device(s) 104 and/or the input/output devices 108 to emit light in one or more colors to provide visual indicators to the users 206. In at least one example, as described below, the light-emitting devices 110 associated with a charging device 104 and/or the input/output devices 108 can emit light in a particular color to provide a visual indicator to a user 206 that one or more actions can be taken to improve the performance of the user device 102.

Figure 5:
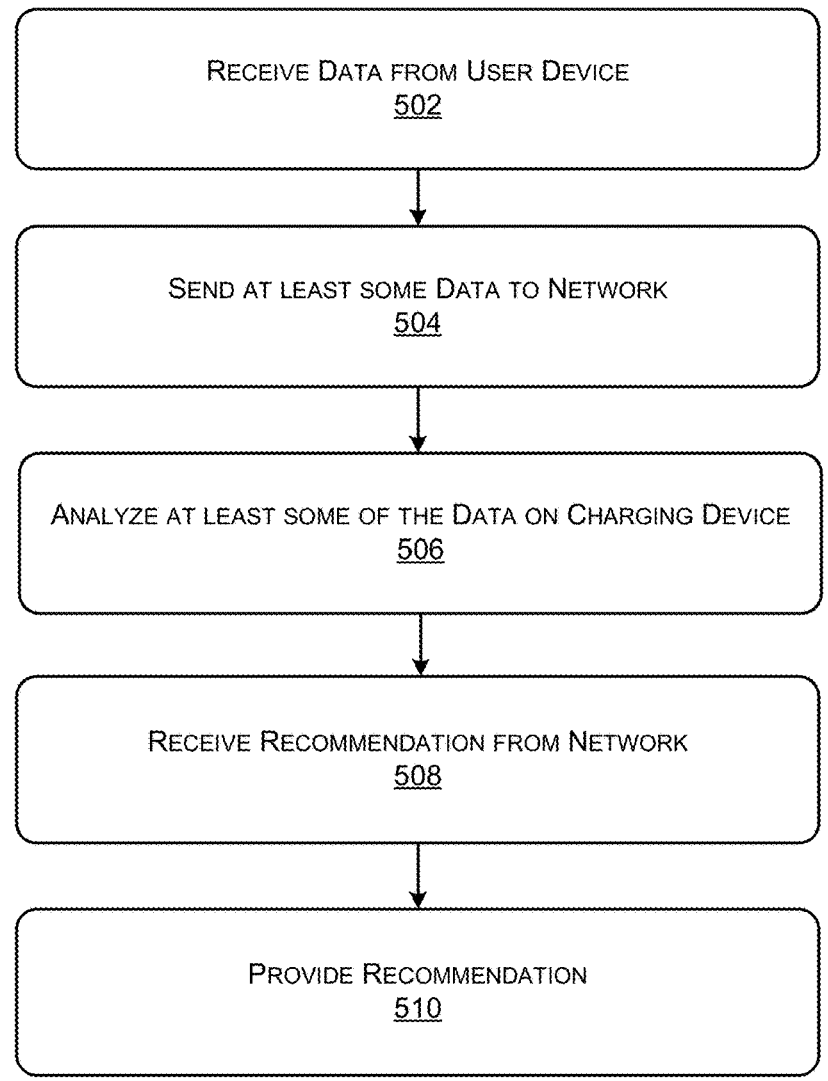
FIG. 5 is a flow diagram that shows another example process for diagnosing and remedying problems on user devices via self-healing charging devices.

FIG. 5 is a flow diagram that shows another example process 500 for diagnosing and remedying problems on user device(s) 102 via self-healing charging device(s) 104.

Block 502 illustrates receiving data from a user device 102 connected to a charging device 104. As described above, based at least in part on the user device 102 detecting a connection to the charging device 104, at least one application 212 can query logs, parameters, and/or data on the user device 102. The user device 102 can send the logs, parameters, and/or data to the charging device 104.

Block 504 illustrates sending at least some data to a network 106. The communicating module 228 stored on the charging device 104 can send at least some of the logs, parameters, and/or data from the user device 102 to the server(s) and/or other machines 204 associated with the network(s) 106. The logs, parameters, and/or data from the user device 102 can be received by a communicating module 242 stored on the server(s) and/or other machines 204 associated with the network(s) 106 and the communicating module 242 can provide the logs, parameters, and/or data from the user device 102 to an analyzing module 244 stored on the server(s) and/or other machines 204. The analyzing module 244 can process the logs, parameters, and/or data from the user device 102, as described above. In some examples, the logs, parameters, and/or data from the user device 102 can also be stored in the collecting module 238 for training and/or updating predictive models.

Block 506 illustrates analyzing at least some of the data on the charging device 104. As described above, the communicating module 228 stored on the charging device 104 can send at least some of the logs, parameters, and/or data from the user device 102 to the server(s) and/or other machines 204 associated with the network(s) 106. However, the charging device 104 may not send all of the logs, parameters, and/or data from the user device 102. Instead, the charging device 104 can keep some of the logs, parameters, and/or data from the user device 102 on the charging device 104 for processing by the analyzing module 230 stored on the charging device 104.

Block 508 illustrates receiving a recommendation from the network(s) 106. The recommending module 246 stored on the server(s) and/or other machines 204 can receive diagnostic data from the analyzing module 244 stored on the server(s) and/or other machines 204. The diagnostic data may identify issues that may be affecting performance of the user device 102 from the analyzing module 244 stored on the server(s) and/or other machines 204. The recommending module 246 may leverage the diagnostic data to determine actions the user can take with respect to the user device 102 to remedy and/or prevent performance degradation. In at least some examples, the recommending module 246 may generate options for remedying and/or preventing performance degradation in the user device 102 and instructions for implementing the options that may be executed by the user device 102 receiving the instructions. As described above, the recommending module 246 can leverage various techniques to filter through the diagnostic data in determining diagnostic data items to include in the recommendations.

The recommending module 246 can output a recommendation to the communicating module 242 for sending the recommendation to the charging device 104. The communicating module 228 on the charging device 104 can receive the recommendation and provide the recommendation to the recommending module 232 on the charging device 104.

Block 510 illustrates providing a recommendation to the charging device 104 or the user device 102. The recommending module 232 stored on the charging device 104 can output the recommendations to the presenting module 218, as described above. The communicating module 228 stored on the charging device 104 can send recommendations to the presenting module 218 based at least in part on recommendations provided by the recommending module 246 stored in the server(s) and/or other machines 204 and/or the recommending module 232 stored on the charging device 104. As described above, the presenting module 218 may cause user interfaces configured to present the recommendations to be displayed via display 214 and/or display 226.

In additional and/or alternative examples, the recommending module 232 can send data associated with the recommendations to the application(s) 212 and a particular application associated with the light-emitting functionality can send data to the notifying module 221 to direct the light-emitting devices 110 associated with the charging device(s) 104 and/or the input/output devices 108 to emit light in one or more colors to provide visual indicators to the users 206. In at least one example, as described below, the light-emitting devices 110 associated with a charging device 104 and/or the input/output devices 108 can emit light in a particular color to provide a visual indicator to a user 206 that one or more actions can be taken to improve the performance of the user device 102.

Figure 6:
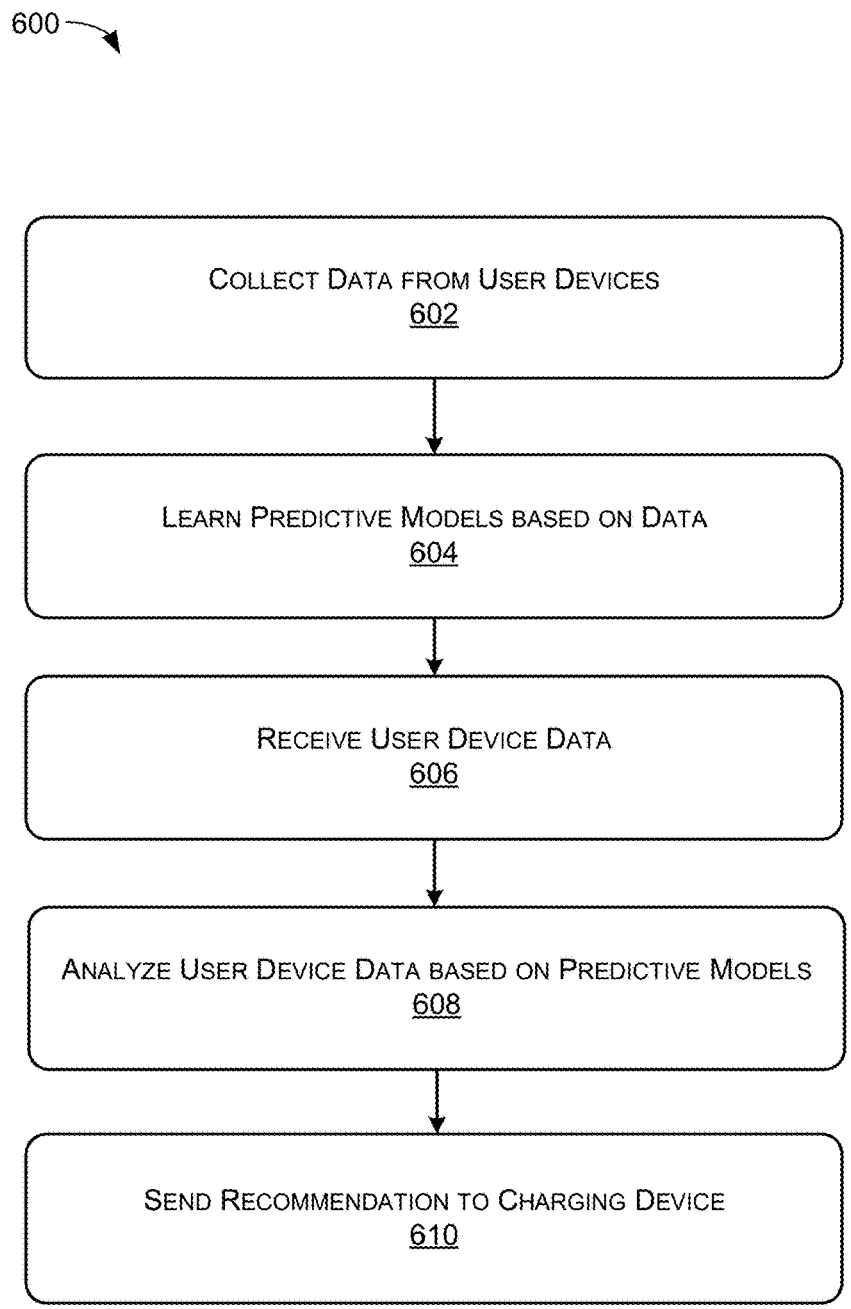
FIG. 6 is a flow diagram that shows another example process for diagnosing and remedying problems on user devices via self-healing charging devices.

FIG. 6 is a flow diagram that shows another example process 600 for diagnosing and remedying problems on user device(s) 102 via self-healing charging device(s) 104.

Block 602 illustrates collecting data from user device(s) 102 communicatively coupled to the network(s) 106. The collecting module 238 can collect data associated with a plurality of users 206 of a plurality of user device(s) 102 associated with the network(s) 106. The collecting module 238 can collect demographic data such as gender, age, profession, geographic locations, travel patterns, etc. In at least some examples, the demographic data can be stored in user profiles corresponding to individual users 206 in the database 239. The collecting module 238 can also collect activity logs and/or debugging logs from user device(s) 102 that are communicatively coupled to the network(s) 106. Additionally and/or alternatively, the storage module 216 can collect data associated with application(s) 212 running on the user device(s) 102, the OS running on the user device(s) 102, core software running on the user device(s) 102, hardware associated with the user device(s) 102, etc. In at least some examples, the activity logs and/or debugging logs and/or additional data (e.g., application data, OS data, core software data, hardware data, etc.) can be stored in user profiles corresponding to individual users 206 in the database 239. The activity logs and/or demographic data and/or additional data can be used to determine usage patterns, as described above. The debugging logs from user device(s) 102 that are communicatively coupled to the network(s) 106 can be used to correlate usage patterns with issues that cause degradation of performance on the user device(s) 102.

The collecting module 238 can collect data from the plurality of user device(s) 102 and/or from charging device(s) 104 charging individual user device(s) 102 of the plurality of user device(s) 102. In at least some examples, the logs, parameters, and data received by charging device(s) 104 from user device(s) 102 can be sent to the collecting module 238 via the charging device(s) 104. In other examples, the user device(s) 102 can communicate directly with the network(s) 106. In at least some examples, the data associated with the plurality of user device(s) 102 and/or charging device(s) 104 can be stored in user profiles corresponding to individual users 206 in the database 239, as described above.

Block 604 illustrates learning predictive models based on data, including the data from the user device(s) 102. The learning module 240 can leverage machine learning to develop predictive models based on the demographic data, usage patterns, and/or issues that cause degradation of performance on the user devices. The learning module 240 can provide the predictive models to the analyzing module 244 stored on the server(s) and/or other machines 204 for identifying issues that can reduce the efficiency of user device performance based on logs, parameters, and/or other data received from the user device(s) 102. The collecting module 238 can collect new data over time and the learning module 240 can leverage the new data to update the predictive models.

Block 606 illustrates receiving user device data. As described above, based at least in part on a user device 102 detecting a connection to a charging device 104, an application 212 can query logs, parameters, and/or data on the user device 102. The user device 102 can send the logs, parameters, and/or data to the charging device 104 and the communicating module 228 stored on the charging device 104 can send the logs, parameters, and/or data to the server(s) and/or other machines 204.

Block 608 illustrates analyzing user device data based on predictive models. The analyzing module 244 stored on the server(s) and/or other machines 204 can identify issues that may affect performance of the user device 102 based at least in part on predictive models trained in the learning module 240. The analyzing module 244 can leverage the predictive models for processing the logs, parameters, and/or data from the user device 102 to identify usage patterns associated with the users 206 of the user device 102 that may affect performance of the user device 102.

Block 610 illustrates sending recommendations to the charging device 104. The recommending module 246 stored on the server(s) and/or other machines 204 can receive diagnostic data from the analyzing module 244. The diagnostic data can identify issues that may be affecting performance of the user device 102 from the analyzing module 244 stored on the server(s) and/or other machines 204. The recommending module 246 may leverage the diagnostic data to determine actions the user 206 can take with respect to the user device 102 to remedy and/or prevent performance degradation. The recommending module 246 stored on the server(s) and/or other machines 204 can send recommendations to the communicating module 242 for sending the recommendation to the charging device 104. The communicating module 228 stored on the charging device 104 can receive the recommendation and provide the recommendation to the recommending module 232 stored on the charging device 104. The recommendation module 232 may provide the recommendation to the presenting module 218 and the presenting module 218 may cause user interfaces configured to present the recommendations to be displayed via display 214 and/or display 226.

In additional and/or alternative examples, the recommending module 232 can send data associated with the recommendations to the application(s) 212 and a particular application associated with the light-emitting functionality can send data to the notifying module 221 to direct the light-emitting devices 110 associated with the charging device(s) 104 and/or the input/output devices 108 to emit light in one or more colors to provide visual indicators to the users 206. In at least one example, as described below, the light-emitting devices 110 associated with a charging device 104 and/or the input/output devices 108 can emit light in a particular color to provide a visual indicator to a user 206 that one or more actions can be taken to improve the performance of the user device 102.

Figure 7:
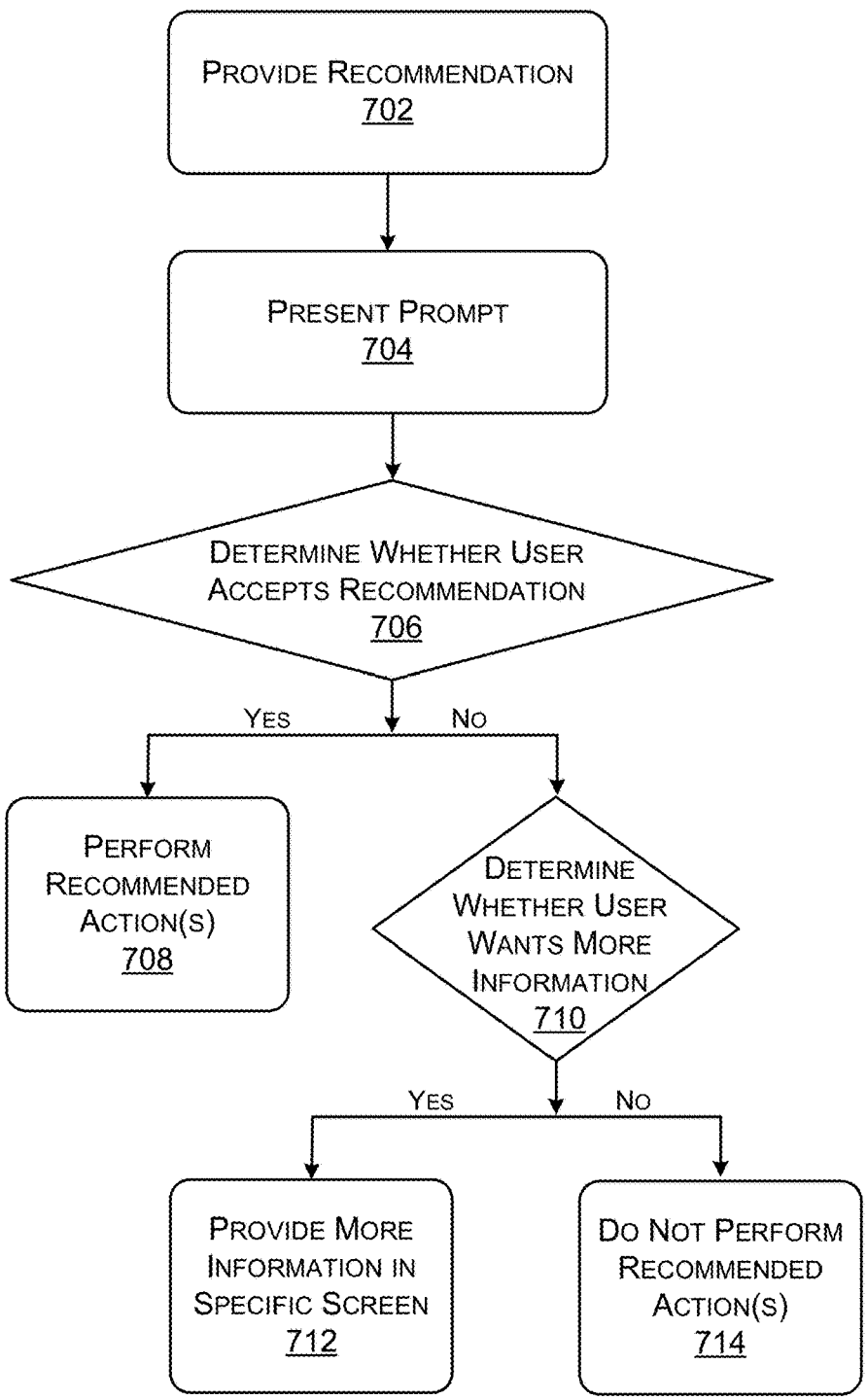
FIG. 7 is a flow diagram that shows an example process for presenting prompts based on recommendations for diagnosing and remedying problems on user devices via self-healing charging devices.

FIG. 7 is a flow diagram that shows an example process 700 for presenting prompts based on recommendations for diagnosing and remedying problems on user device(s) 102 via self-healing charging device(s) 104.

Block 702 illustrates providing a recommendation. The recommending module 232 stored on a charging device 104 and/or the recommending module 246 stored on the server(s) and/or other machines 204 can output the recommendations to the presenting module 218, as described above. In at least one example, the recommending module 232 and/or the recommending module 246 can output the recommendations to communicating module 228 and/or communicating module 242 for sending the recommendations to the presenting module 218. In at least some examples, the recommending module 232 and/or recommending module 246 may generate options for remedying and/or preventing performance degradation in a user device 102 and instructions for implementing the options that may be executed by the user device 102 receiving the instructions.

Block 704 illustrates presenting a prompt based on the recommendation. The presenting module 218 can communicate with the application(s) 212 to cause recommendations to be presented to a user as prompts for receiving user input. The presenting module 218 can present a prompt to the user 106 via the display 214 and/or display 226. In some examples, the prompt can include a general screen that presents users 206 with one or more options for remedying and/or preventing performance degradation in the user device 102. For instance, the prompt can provide the user 206 with an option to perform all actions recommended to remedy and/or prevent performance degradation in the user device 102, an option to deny all actions recommended for remedying and/or preventing performance degradation in the user device 102, or an option to deny all actions recommended for remedying and/or preventing performance degradation in the user device 102 and to view a specific screen. Additionally or alternatively, the prompt can provide the user 206 with an option to perform all actions recommended and to always perform all actions without future prompting, an option to deny all actions recommended and to always deny all actions without future prompting, or an option to always provide a specific screen. The specific screen can present users 206 with additional information, such as an itemized list of actions that the recommending module 232 and/or recommending module 246 recommends to be taken to remedy and/or prevent performance degradation in the user device 102. As described above, a non-limiting examples of actions can include application(s) 212 to close or uninstall, settings to change to increase battery life, updates to download to improve performance, etc. Users 206 can then selectively identify which actions of the recommended actions they would like to take to remedy and/or prevent performance degradation in his or her user device 102.

Decision block 706 illustrates determining whether a user 206 accepts the recommendation. The user 206 can interact with the display (e.g., 214 or 224) by selecting an option via a touch user interface, dictating an option via a spoken-language interface, actuating a mechanism associated with the hardware of the user device 102, etc. The user 206 can indicate that he or she accepts the recommendation, allowing the healing module 220 to take all actions recommended by the recommendation, or the user 206 can reject the recommendation.

Block 708 illustrates performing the recommended action(s) based at least in part on receiving user input indicating that the user 206 accepts the recommendation. Based at least in part on receiving an indication from a user 206 to perform the actions recommended by the recommending module 232 and/or recommending module 246, the healing module 220 can effectuate those actions by executing the instructions received from recommending module 232 and/or recommending module 246. For instance, the healing module 220 can partially restart the user device(s) 102, reset or recharge the battery, close down one or more application(s) 212 running in the background, etc. Additionally and/or alternatively, the healing module 220 can initiate a download of an update (e.g., OS update, core software update, hardware update, etc.), delete unused application(s) 212 and/or data files, turn-off unused peripheral devices (e.g., radios, etc.), etc.

Decision block 710 illustrates determining whether the user wants more information, based at least in part on receiving user input indicating that the user does not accept the recommendation. As described above, the user can select the option to deny all actions recommended for remedying and/or preventing performance degradation in the user device 102 or the option to deny all actions recommended for remedying and/or preventing performance degradation in the user device 102 and to view a specific screen. The specific screen can present users 206 with additional information, such as an itemized list of actions that the recommending module 232 and/or recommending module 246 recommends to be taken to remedy and/or prevent performance degradation in the user device 102. For instance, non-limiting examples of actions can include application(s) 212 to close or uninstall, settings to change to increase battery life, updates to download to improve performance, etc.

Block 712 illustrates providing more information in a specific screen based at least in part on receiving user input indicating the user wants more information. As discussed above, users 206 can selectively identify which actions of the recommended actions in the list of actions they would like to allow the healing module 220 to effectuate to remedy and/or prevent performance degradation in his or her user device 102.

Block 714 illustrates not performing recommended action(s) based at least in part on receiving user input indicating that the user 206 does not want more information. As described above, the user 206 can reject the recommendation and may not indicate that he or she wants any additional information. Accordingly, the healing module 220 can refrain from performing any actions to improve the performance of the user device 102.

In addition to providing recommendations to users 206 via user interfaces and/or visual indicators via the user device(s) 102 and/or charging device(s) 104, the techniques described herein can utilize the logs, parameters, and data in additional and/or alternative ways. In some examples, the presenting module 218 can present user interfaces that convey information about a user device 102, such as, but not limited to, battery health (e.g., percent charged, temperature, remaining time, history of battery use, etc.), energy impact (e.g., energy usage by hour, by week, etc.), application statuses (e.g., what application(s) 212 are running, how much data are individual application(s) 212 consuming, etc.), etc.

In additional and/or alternative examples, individuals associated with the service provider 202 (e.g., technicians, retail store employees, consultants, product developers, etc.) can leverage the data to identify trends associated with user device(s) 102 associated with their network(s) 106 and/or services. In some examples, individuals associated with the service provider 202 can access the diagnostic data associated with individual user profiles and corresponding accounts via user interfaces that provide the individuals associated with the service provider 202 with information to identify problems with a user device 102 and improve performance of the user device 102. In such examples, the user interfaces provided to individuals associated with the service provider 202 can include additional and/or alternative information than what is provided to individual users 206.

Figure 8:
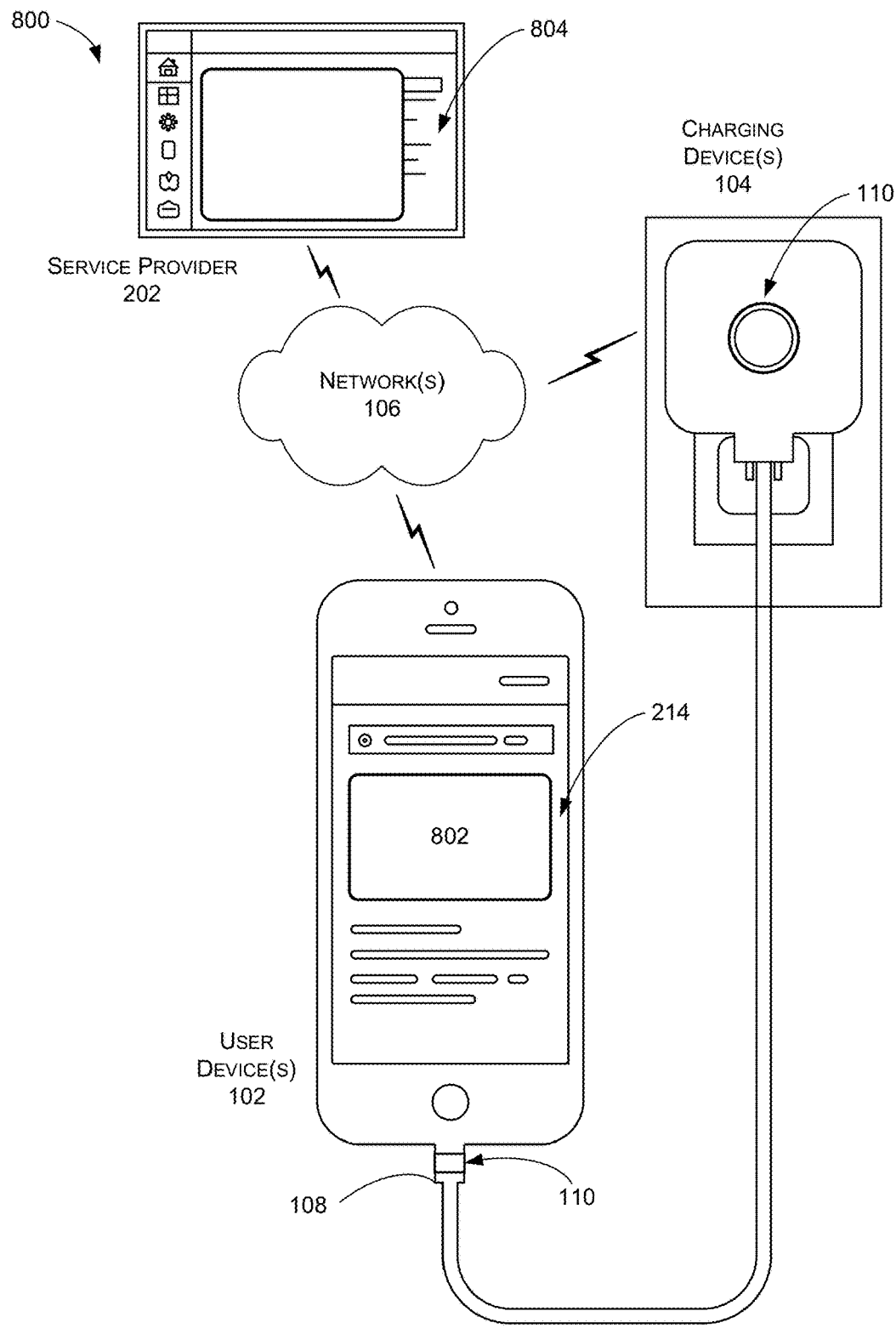
FIG. 8 is a schematic diagram illustrating an example environment for providing diagnostic information via self-healing charging devices and/or customized user interfaces.

FIG. 8 is a schematic diagram illustrating an example environment 800 for providing diagnostic information to users 206 via self-healing charging devices 104 and/or user interfaces that provide individuals associated with the service provider 202 with information to identify problems with a user device 102 and improve performance of the user device 102. As illustrated in FIG. 8, the presentation module 218 can cause an indication 802 to be presented on the display 214 of the user device 102. The indication 802 can include information based on the diagnostic data described, above. For instance, the indication 802 can provide the user 206 with a list of actions that can be taken to improve the performance of the user device 102, a recommendation for actions that can be taken to improve the performance of the user device, etc. In some examples, the recommendation can be associated with an option to perform all actions to remedy and/or prevent performance degradation in the user device (s) 102, an option to deny all actions for remedying and/or preventing performance degradation in the user device(s) 102, or an option to view a specific screen. The specific screen, as described above, can include a list of actions that can be taken to improve the performance of the user device 102. In additional and/or alternative examples, the indication 802 may be presented on display 226 of the charging device 104.

In at least one example, a user interface 804 can be generated for individuals associated with the service provider 202 that presents additional and/or alternative information to the individual associated with the service provider 202. In some examples, the user interface 804 can include a same list of actions as is presented to the user 206, but may include additional details and/or instructions regarding how to remedy the problem, why the problem occurred, etc.

As described above, the recommending module 232 and/or recommending module 246 can send data associated with the recommendations to the application(s) 212. A particular application of the application(s) 212 can be associated with the light-emitting functionality of the charging device(s) 104 and/or the input/output devices 108. The light-emitting functionality of the charging device(s) 104 and/or the input/output devices 108 can enable the charging device(s) 104 and/or the input/output devices 108 to emit different colors of light to notify the user 206 of different types of information. That is, the charging device(s) 104 and/or the input/output devices 108 can provide visual indications to the users 206 indicating receipt of different data types and/or signaling that one or more actions can be taken to improve the performance of corresponding user device(s) 102. In some examples, the charging device(s) 104 and/or the input/output devices 108 can emit a single color for all visual indications or different colors that correspond to data corresponding to different sources and/or different content.

Figure 9:
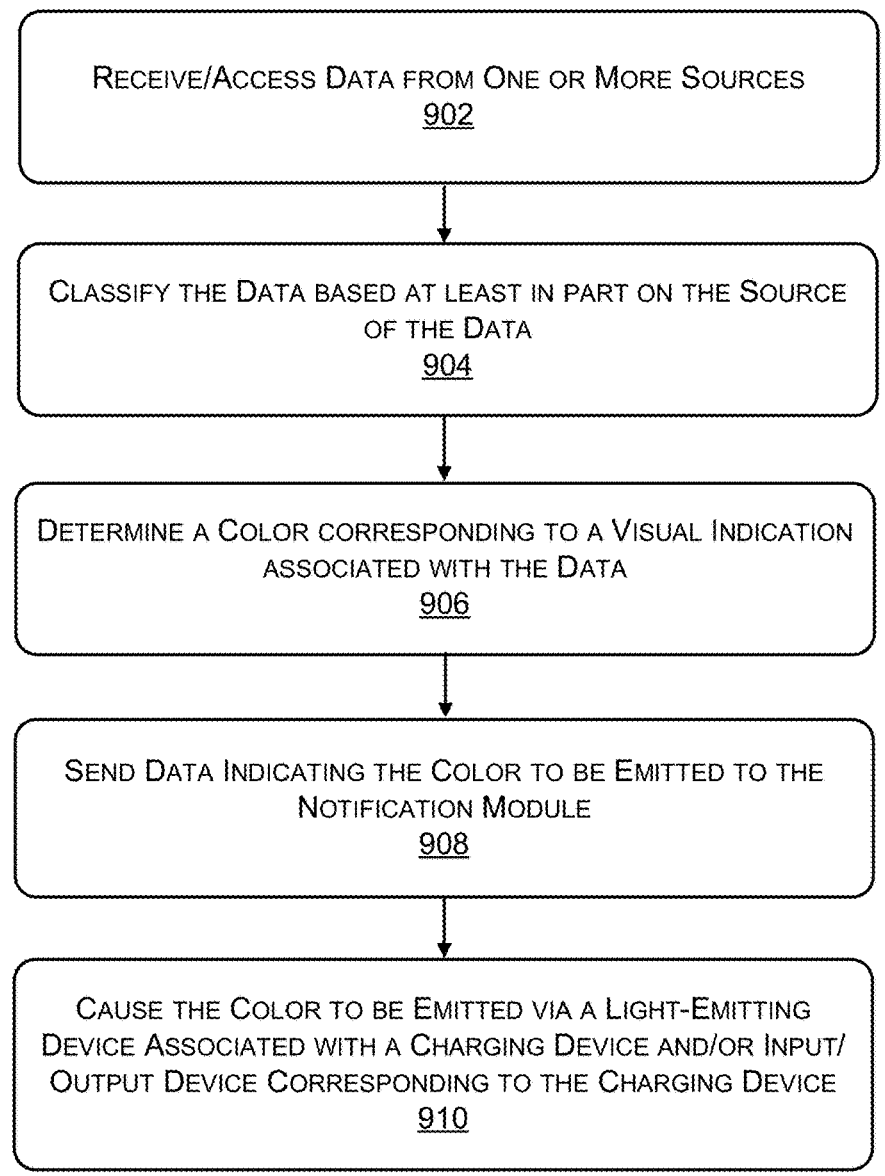
FIG. 9 is a flow diagram that shows an example process for classifying incoming data to determine a color to emit via the light-emitting functionality of self-healing charging devices.

In examples where the charging device(s) 104 and/or the input/output devices 108 can emit different colors that correspond to data corresponding to different sources and/or different content, the particular application that is associated with the light-emitting functionality can receive data from various sources and can classify the data to direct the light-emitting device to emit the corresponding color. FIG. 9 is a flow diagram that shows an example process 900 for classifying incoming data to determine which color to emit via the light-emitting functionality of self-healing charging devices (e.g., charging device(s) 104).

Block 902 illustrates receiving and/or accessing data from one or more sources. The particular application that is associated with the light-emitting functionality can access and/or receive data from various sources. For instance, the particular application can receive data (e.g., diagnostic data) from recommending module 232 and/or recommending module 246. Additionally and/or alternatively, the particular application can receive data from the service provider 202 (or other user devices 102 communicatively coupled to the service provider 202 via the network(s) 106), third-party entities (e.g., messaging/mailing service providers, social networking service providers, etc.), etc. Moreover, the particular application can access data (e.g., logs, parameters, data, etc.) stored in the storing module 216 and/or the database 239.

Block 904 illustrates classifying the data based at least in part on the source of the data. The particular application that is associated with the light-emitting functionality can classify the data based at least in part on determining the source of the data. For instance, data received from the recommending module 246 and/or recommending module 232 can be classified as diagnostic data and data received from a third-party entity can be classified as such. In some examples, the particular application can classify the data based at least in part on the content of the data. For instance, the particular application can differentiate between an email received from a first email account and an email received from a second email account.

Block 906 illustrates determining a color corresponding to a visual indication associated with the data. In some examples, different data from different sources can be associated with different colors. In such examples, based at least in part on classifying the data, the particular application that is associated with the light-emitting functionality can determine which color corresponds to the data.

For instance, a first color can correspond to a diagnostic notification, or a visual indication associated with the health and/or performance of the user device 102. The diagnostic notification can signal to a user that one or more actions can be taken to improve the performance of a corresponding user device 102. A second color can correspond to the charging status of the phone. For instance, the notification module 221 can determine that the battery of the user device 102 is fully charged and accordingly, can direct the light-emitting devices 110 to emit the second color of light. In at least one example, in addition to directing the light-emitting devices 110 to emit the second color of light, the notification module 221 can terminate any alternating current (A/C) power to the corresponding user device 102. A third color can correspond to messaging notifications from a particular entity, such as the service provider 202, and a fourth color can correspond to notifications from third-party entities, such as third-party messaging/mailing service providers, social networking service providers, etc.

The examples provided above are non-limiting examples. Additional and/or alternative colors can be used for additional and/or alternative types of incoming data. As described above, in some examples, data associated with different content can be associated with different colors as well.

Block 908 illustrates sending data indicating the color to be emitted to the notification module 221. Based at least in part on classifying the data, the particular application that is associated with the light-emitting functionality can send data to the notification module 221. The data can indicate a particular color to be emitted via the light-emitting devices 110.

Block 910 illustrates causing the color to be emitted via a light-emitting device 110 associated with a charging device 104 and/or an input/output device 108 corresponding to the charging device 104. The notification module 221 can send data including an instruction to the light-emitting devices 110 causing the light-emitting devices to emit the particular color.

The notification module 221 can send the data to the light-emitting devices 110 in a continuous stream, at particular frequencies, etc. In some examples, where more than one type of data is received by the particular application associated with the light-emitting functionality, the particular application can send first data indicating a first color, second data indicating a second color, third data indicating a third color, etc. In some examples, data from one of the sources can be determined to be more important than the other data. In such examples, the light-emitting devices 110 can emit the color corresponding to that data and may not emit any other colors. Or, in some examples, the particular application associated with the light-emitting functionality can send the first data indicating a first color, the second data indicating a second color, the third data indicating a third color, etc. in a predetermined pattern.

In some examples, the notification module 221 may continue to send the data including an instruction to the light-emitting devices 110 causing the light-emitting devices 110 to emit the color until the notification module 221 receives updated data to stop sending the data. In other examples, the notification module 221 may continue to send the data including an instruction to the light-emitting devices 110 causing the light-emitting devices 110 to emit the color for a predetermined amount of time, a predetermined number of times, etc.

The particular application that is associated with the light-emitting functionality can enable users 206 to control the light-emitting functionality by indicating preferences associated with the light-emitting functionality. For instance, in some examples, the users 206 can specify particular colors for particular types of data. Or, in other examples, the users 206 can specify when to turn the light-emitting functionality off temporarily (e.g., at night, during certain work events, etc.), permanently, etc. In such examples, the notification module 221 can determine whether causing the particular color to be emitted via the light-emitting device 110 is consistent with the user preferences before sending the data with the instruction to the light-emitting devices 110.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A charging device comprising:
a first light-emitting device;
one or more processors; and
a computer-readable media that includes a plurality of computer-executable components, the plurality of computer-executable components comprising:
a communicating module to send and receive first data, the first data comprising at least one of network data, application data, operating system data, or core software data received from a user device communicatively connected to the charging device;
an analyzing module to process at least some of the first data and to generate diagnostic data associated with the user device; and
a notification module to cause a first visual notification to be presented via the first light-emitting device, the first visual notification being based at least in part on the first light-emitting device emitting a first color corresponding to the diagnostic data.

2. The charging device of claim 1, wherein the analyzing module processes the first data based at least in part on:
accessing the first data received from the user device; and
scanning the first data to identify at least one of:
bad mapping affecting the performance of the user device;
a status of at least one of off-device services and content, location problems, network problems, connectivity problems, individual applications, or core software;
data consumption associated with at least one of the individual applications or core software; or
updates that are available for at least one of the individual applications, an operating system, or core software associated with the user device.

3. The charging device of claim 1, wherein the plurality of computer-executable components further comprise a recommending module to determine, based at least in part on the diagnostic data, one or more actions that can be taken to improve performance of the user device.

4. The charging device of claim 1, wherein the notification module is further configured to cause a second visual notification to be presented via the first light-emitting device, the second visual notification being based at least in part on the first light-emitting device emitting a second color corresponding to second data associated with a service provider.

5. The charging device of claim 1, wherein the notification module is further configured to cause a second visual notification to be presented via the first light-emitting device, the second visual notification being based at least in part on the first light-emitting device emitting a second color corresponding to second data associated with third-party service providers.

6. The charging device of claim 1, wherein the notification module is further configured to cause a second visual notification to be presented via the first light-emitting device, the second visual notification being based at least in part on the first light-emitting device emitting a second color corresponding to second data indicating that a battery corresponding to the user device is charged.

7. The charging device of claim 6, wherein, based at least in part on causing the second visual notification to be presented via the first light-emitting device, the notification module is further configured to terminate alternating current power to the user device.

8. The charging device of claim 1, further comprising a Universal Serial Bus (USB) to provide a wired connection between the charging device and the user device, the USB being associated with a second light-emitting device.

9. The charging device of claim 8, wherein the notification module is further configured to cause the first visual notification to be presented via the second light-emitting device.

10. The charging device of claim 1, further comprising an optical sensor for identifying the user device.

11. A computer-implemented method, comprising:
receiving, at a charging device, first data from a user device connected to the charging device, wherein the first data received from the user device comprises at least one of network data, demographic data, application data, operating system data, or core software data;
analyzing, at the charging device, the first data to determine diagnostic data associated with the user device; and
based at least in part on determining the diagnostic data, providing an indication via at least one of the charging device or the user device, the indication signifying available actions that can be taken to improve performance of the user device.

12. The computer-implemented method of claim 11, wherein receiving the first data from the user device is based at least in part on determining a connection between the user device and the charging device.

13. The computer-implemented method of claim 11, wherein analyzing the first data comprises scanning the first data received from the user device to identify causes of performance degradation in the user device.

14. The computer-implemented method of claim 11, wherein the indication is a recommendation including one or more actions that can be taken to improve the performance of the user device.

15. The computer-implemented method of claim 14, further comprising:
generating options for improving the performance of the user device and instructions for implementing the options that may be executed by the user device; and
causing the options to be presented with the recommendation.

16. The computer-implemented method of claim 15, wherein the options comprise:
a first option to perform each of the one or more actions;
a second option to perform none of the one or more actions; and
a third option to view the one or more actions that can be taken to improve the performance of the user device.

17. The computer-implemented method of claim 11, wherein:
the indication is a visual indication; and
the computer-implemented method further comprises:
sending second data including instructions to a light-emitting device associated with the charging device; and
causing the light-emitting device to emit a color corresponding to the diagnostic data.

18. A non-transitory computer-readable medium storing computer-executable instructions that, when executed, cause one or more processors to perform acts comprising:
receiving, at a user device, first data from at least one of a charging device communicatively coupled to the user device or a service provider communicatively coupled to the user device;
determining that the first data is diagnostic data, wherein the diagnostic data received at the user device identifies one or more issues affecting performance of the user device based upon at least one of network data, demographic data, application data, operating system data, or core software data from the user device;
based at least in part on determining that the first data is diagnostic data, determining a color corresponding to a visual indication associated with the diagnostic data;
sending second data indicating the color to the charging device; and
causing a first light-emitting device associated with the charging device to emit the color.

19. The non-transitory computer-readable medium of claim 18, the acts further comprising causing a second light-emitting device corresponding to a Universal Serial Bus connected to the user device and the charging device to emit the color at substantially a same time that the first light-emitting device emits the color.

20. The non-transitory computer-readable medium of claim 18, the acts further comprising receiving, at the user device, a recommendation including one or more actions that can be taken to improve performance of the user device.

* * * * *